United States Patent
Ryu et al.

(10) Patent No.: US 11,564,206 B2
(45) Date of Patent: *Jan. 24, 2023

(54) SIDELINK RESOURCE POOL DISTRIBUTION

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Chester, NJ (US); Kapil Gulati, Belle Mead, NJ (US); Juan Montojo, San Diego, CA (US); Jelena Damnjanovic, Del Mar, CA (US); Ling Ding, Chester, NJ (US); Hong Cheng, Basking Ridge, NJ (US); Mahmoud Taherzadeh Boroujeni, San Diego, CA (US); Jingchao Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 17/107,344

(22) Filed: Nov. 30, 2020

(65) Prior Publication Data

US 2021/0195560 A1 Jun. 24, 2021

Related U.S. Application Data

(60) Provisional application No. 62/950,877, filed on Dec. 19, 2019.

(51) Int. Cl.
*H04W 72/02* (2009.01)
*H04W 72/04* (2009.01)
(Continued)

(52) U.S. Cl.
CPC .......... *H04W 72/02* (2013.01); *H04W 24/08* (2013.01); *H04W 28/26* (2013.01); *H04W 72/0446* (2013.01)

(58) Field of Classification Search
CPC ..... H04W 72/02; H04W 24/08; H04W 28/26; H04W 72/0446
See application file for complete search history.

(56) References Cited

U.S. PATENT DOCUMENTS

| 2018/0049143 | A1* | 2/2018 | Gupta | H04W 16/14 |
| 2021/0160820 | A1 | 5/2021 | Ryu et al. | |
| 2022/0167315 | A1* | 5/2022 | Park | H04W 88/04 |

FOREIGN PATENT DOCUMENTS

WO WO-2019200087 A1 10/2019

OTHER PUBLICATIONS

International Search Report and Written Opinion—PCT/US2020/062739—ISA/EPO—dated Mar. 19, 2021 (201149WO).

* cited by examiner

*Primary Examiner* — Chae S Lee
(74) *Attorney, Agent, or Firm* — Arun Swain; Holland & Hart LLP

(57) ABSTRACT

Methods, systems, and devices for wireless communications are described. A first UE may transmit a sidelink request to a second UE. The sidelink request may indicate a set or a segment of the data resources. A second UE may transmit a positive sidelink response indicating that the set or the segment of resources is available for reservation, or may refrain from transmitting a positive sidelink response if the set or the segment of the data resources is unavailable for reservation. A third UE may transmit a negative sidelink response indicating that the set or the segment of the data resources is unavailable for reservation, or may refrain from transmitting a negative sidelink response if the set or the (Continued)

segment of the data resources is available for reservation. If the requested data resources are available, then the first UE may transmit a sidelink confirmation reserving the requested data resources.

28 Claims, 14 Drawing Sheets

(51) Int. Cl.
*H04W 28/26* (2009.01)
*H04W 24/08* (2009.01)

SIDELINK RESOURCE POOL DISTRIBUTION

CROSS REFERENCE

The present Application for Patent claims the benefit of U.S. Provisional Patent Application No. 62/950,877 by RYU et al., entitled "SIDELINK RESOURCE POOL DISTRIBUTION," filed Dec. 19, 2019, assigned to the assignee hereof, and expressly incorporated by reference herein.

TECHNICAL FIELD

The following relates generally to wireless communications and more specifically to sidelink resource pool distribution.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, one or more base stations may communicate with one or more UEs, for examples, using uplink communication or downlink communication or both. Additionally, UEs can also communicate with each other, for example, over sidelink communication links. In some cases, the one or more base stations may allocate resources for the sidelink communications performed by the UEs.

SUMMARY

The described techniques relate to improved methods, systems, devices, and apparatuses that support sidelink resource pool distribution. Generally, the described techniques provide for efficiently sharing available data resources in a pool of shared data resources configured for communication on sidelinks. Various user equipments (UEs) may communicate with each other over sidelink control resources to claim the shared data resources for sidelink data transmissions. In some examples, the UEs may claim a portion of the available data resources. For example, a first UE may transmit a sidelink request to a second UE (for example, a target UE). The sidelink request may indicate a set of data resources or a defined segment of the data resources for reservation. The first UE may monitor for sidelink responses from one or more other UEs. For example, a second UE (for example, a target UE) may transmit a positive sidelink response indicating that the requested set of resources or the defined segment of the resources is available for reservation, or may refrain from transmitting a positive sidelink response if the requested set of data resources or the defined segment of the data resources is unavailable for reservation. In some examples, the second UE may transmit a negative sidelink response indicating that the requested set of data resources or the determined segment of the data resources is unavailable for reservation. A third UE (for example, a non-target UE) may transmit a negative sidelink response indicating that the requested set of data resources or the determined segment of the data resources is unavailable for reservation, or may refrain from transmitting a negative sidelink response if the requested set of data resources or the determined segment of the data resources is available for reservation. In some examples, the third UE may transmit a positive sidelink response indicating that the requested set of data resources or the determined segment of the data resources is available for reservation. If the first UE determines that the requested set of data resources or the determined segment of the data resources is available, for example based on one or more sidelink responses, then the first UE may transmit a sidelink confirmation indicating the reserved data resources over which the first UE will send one or more data transmissions.

One innovative aspect of the subject matter described in this disclosure can be implanted in a method of wireless communications at a first UE. The method may include determining shared resources for communicating over one or more sidelink communication links, the shared resources including control resources and data resources, the control resources and the data resources in a set of slots, transmitting, to a second UE on a transmission beam over the control resources in a first portion of a slot of the set of slots, a sidelink request indicating a first set of the data resources for reservation, monitoring, by the first UE on a receive beam over the control resources in a second portion of the slot, for one or more sidelink responses from one or more UEs, the one or more sidelink responses including one or more positive sidelink responses indicating a first group of the data resources as available for reservation, or one or more negative sidelink responses indicating a second group of the data resources as unavailable for reservation, or both, and determining, based on the monitoring, whether to transmit a sidelink confirmation indicating a reservation of at least a portion of the first set of the data resources to the second UE over the control resources in a third portion of the slot.

Another innovative aspect of the subject matter described in this disclosure can be implemented by an apparatus for wireless communications at a first UE. The apparatus may include a processor, memory coupled with the processor, and instructions stored in the memory. The instructions may be executable by the processor to cause the apparatus to determine shared resources for communicating over one or more sidelink communication links, the shared resources including control resources and data resources, the control resources and the data resources in a set of slots, transmit, to a second UE on a transmission beam over the control resources in a first portion of a slot of the set of slots, a sidelink request indicating a first set of the data resources for reservation, monitor, by the first UE on a receive beam over the control resources in a second portion of the slot, for one or more sidelink responses from one or more UEs, the one or more sidelink responses including one or more positive sidelink responses indicating a first group of the data resources as available for reservation, or one or more negative sidelink responses indicating a second group of the data resources as unavailable for reservation, or both, and determine, based on the monitoring, whether to transmit a sidelink confirmation indicating a reservation of at least a portion of the first set of the data resources to the second UE over the control resources in a third portion of the slot.

Another innovative aspect of the subject matter described in this disclosure can be implemented by an apparatus for wireless communications at a first UE. The apparatus may include means for determining shared resources for communicating over one or more sidelink communication links, the shared resources including control resources and data resources, the control resources and the data resources in a set of slots, transmitting, to a second UE on a transmission beam over the control resources in a first portion of a slot of the set of slots, a sidelink request indicating a first set of the data resources for reservation, monitoring, by the first UE on a receive beam over the control resources in a second portion of the slot, for one or more sidelink responses from one or more UEs, the one or more sidelink responses including one or more positive sidelink responses indicating a first group of the data resources as available for reservation, or one or more negative sidelink responses indicating a second group of the data resources as unavailable for reservation, or both, and determining, based on the monitoring, whether to transmit a sidelink confirmation indicating a reservation of at least a portion of the first set of the data resources to the second UE over the control resources in a third portion of the slot.

Another innovative aspect of the subject matter described in this disclosure can be implemented by a non-transitory computer-readable medium storing code for wireless communications at a first UE. The code may include instructions executable by a processor to determine shared resources for communicating over one or more sidelink communication links, the shared resources including control resources and data resources, the control resources and the data resources in a set of slots, transmit, to a second UE on a transmission beam over the control resources in a first portion of a slot of the set of slots, a sidelink request indicating a first set of the data resources for reservation, monitor, by the first UE on a receive beam over the control resources in a second portion of the slot, for one or more sidelink responses from one or more UEs, the one or more sidelink responses including one or more positive sidelink responses indicating a first group of the data resources as available for reservation, or one or more negative sidelink responses indicating a second group of the data resources as unavailable for reservation, or both, and determine, based on the monitoring, whether to transmit a sidelink confirmation indicating a reservation of at least a portion of the first set of the data resources to the second UE over the control resources in a third portion of the slot.

Another innovative aspect of the subject matter described in this disclosure can be implemented by a method of wireless communications at a second UE. The method may include determining shared resources for communicating over one or more sidelink communication links, the shared resources including control resources and data resources, the control resources and the data resources in a set of slots, monitoring, on a receive beam over the control resources in a first portion of a slot of the set of slots, for a sidelink request from a first UE indicating a first set of the data resources for reservation, receiving, in the first portion of the slot based on the monitoring, the sidelink request from the first UE, the sidelink request indicating that the second UE is a target UE of the sidelink request, and determining, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both.

Another innovative aspect of the subject matter described in this disclosure can be implemented by an apparatus for wireless communications at a second UE. The apparatus may include a processor, memory coupled with the processor, and instructions stored in the memory. The instructions may be executable by the processor to cause the apparatus to determine shared resources for communicating over one or more sidelink communication links, the shared resources including control resources and data resources, the control resources and the data resources in a set of slots, monitor, on a receive beam over the control resources in a first portion of a slot of the set of slots, for a sidelink request from a first UE indicating a first set of the data resources for reservation, receive, in the first portion of the slot based on the monitoring, the sidelink request from the first UE, the sidelink request indicating that the second UE is a target UE of the sidelink request, and determine, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both.

Another innovative aspect of the subject matter described in this disclosure can be implemented by an apparatus for wireless communications at a second UE. The apparatus may include means for determining shared resources for communicating over one or more sidelink communication links, the shared resources including control resources and data resources, the control resources and the data resources in a set of slots, monitoring, on a receive beam over the control resources in a first portion of a slot of the set of slots, for a sidelink request from a first UE indicating a first set of the data resources for reservation, receiving, in the first portion of the slot based on the monitoring, the sidelink request from the first UE, the sidelink request indicating that the second UE is a target UE of the sidelink request, and determining, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both.

Another innovative aspect of the subject matter described in this disclosure can be implemented by an non-transitory computer-readable medium storing code for wireless communications at a second UE. The code may include instructions executable by a processor to determine shared resources for communicating over one or more sidelink communication links, the shared resources including control resources and data resources, the control resources and the data resources in a set of slots, monitor, on a receive beam over the control resources in a first portion of a slot of the set of slots, for a sidelink request from a first UE indicating a first set of the data resources for reservation, receive, in the first portion of the slot based on the monitoring, the sidelink request from the first UE, the sidelink request indicating that the second UE is a target UE of the sidelink request, and determine, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both.

Another innovative aspect of the subject matter described in this disclosure can be implemented by a method of wireless communications at a first UE (for example, a third or non-target UE). The method may include determining shared resources for communicating over one or more sidelink communication links, the shared resources including control resources and data resources, the control resources and the data resources in a set of slots, monitoring, on a receive beam over the control resources in a first portion of a slot of the set of slots, for a sidelink request from a second UE indicating a first set of the data resources for reservation, receiving, in the first portion of the slot based on the monitoring, the sidelink request from the second UE, the sidelink request indicating that a third UE is a target UE of the sidelink request, and determining, based on receiving the sidelink request, whether to transmit a sidelink response to the second UE on a transmission beam over the control resources in a second portion of the slot, the sidelink response including a positive sidelink response indicating a first group of the data resources as available for reservation, or a negative sidelink response indicating a second group of the data resources as unavailable for reservation, or both.

Another innovative aspect of the subject matter described in this disclosure can be implemented by an apparatus for wireless communications at a first. The apparatus may include a processor, memory coupled with the processor, and instructions stored in the memory. The instructions may be executable by the processor to cause the apparatus to determine shared resources for communicating over one or more sidelink communication links, the shared resources including control resources and data resources, the control resources and the data resources in a set of slots, monitor, on a receive beam over the control resources in a first portion of a slot of the set of slots, for a sidelink request from a second UE indicating a first set of the data resources for reservation, receive, in the first portion of the slot based on the monitoring, the sidelink request from the second UE, the sidelink request indicating that a second UE is a target UE of the sidelink request, and determine, based on receiving the sidelink request, whether to transmit a sidelink response to the second UE on a transmission beam over the control resources in a second portion of the slot, the sidelink response including a positive sidelink response indicating a first group of the data resources as available for reservation, or a negative sidelink response indicating a second group of the data resources as unavailable for reservation, or both.

Another innovative aspect of the subject matter described in this disclosure can be implemented by an apparatus for wireless communications at a first UE. The apparatus may include means for determining shared resources for communicating over one or more sidelink communication links, the shared resources including control resources and data resources, the control resources and the data resources in a set of slots, monitoring, on a receive beam over the control resources in a first portion of a slot of the set of slots, for a sidelink request from a second UE indicating a first set of the data resources for reservation, receiving, in the first portion of the slot based on the monitoring, the sidelink request from the second UE, the sidelink request indicating that a second UE is a target UE of the sidelink request, and determining, based on receiving the sidelink request, whether to transmit a sidelink response to the second UE on a transmission beam over the control resources in a second portion of the slot, the sidelink response including a positive sidelink response indicating a first group of the data resources as available for reservation, or a negative sidelink response indicating a second group of the data resources as unavailable for reservation, or both.

Another innovative aspect of the subject matter described in this disclosure can be implemented by an non-transitory computer-readable medium storing code for wireless communications at a first UE. The code may include instructions executable by a processor to determine shared resources for communicating over one or more sidelink communication links, the shared resources including control resources and data resources, the control resources and the data resources in a set of slots, monitor, on a receive beam over the control resources in a first portion of a slot of the set of slots, for a sidelink request from a second UE indicating a first set of the data resources for reservation, receive, in the first portion of the slot based on the monitoring, the sidelink request from the second UE, the sidelink request indicating that a third UE is a target UE of the sidelink request, and determine, based on receiving the sidelink request, whether to transmit a sidelink response to the second UE on a transmission beam over the control resources in a second portion of the slot, the sidelink response including a positive sidelink response indicating a first group of the data resources as available for reservation, or a negative sidelink response indicating a second group of the data resources as unavailable for reservation, or both.

DETAILED DESCRIPTION

Figure 1:
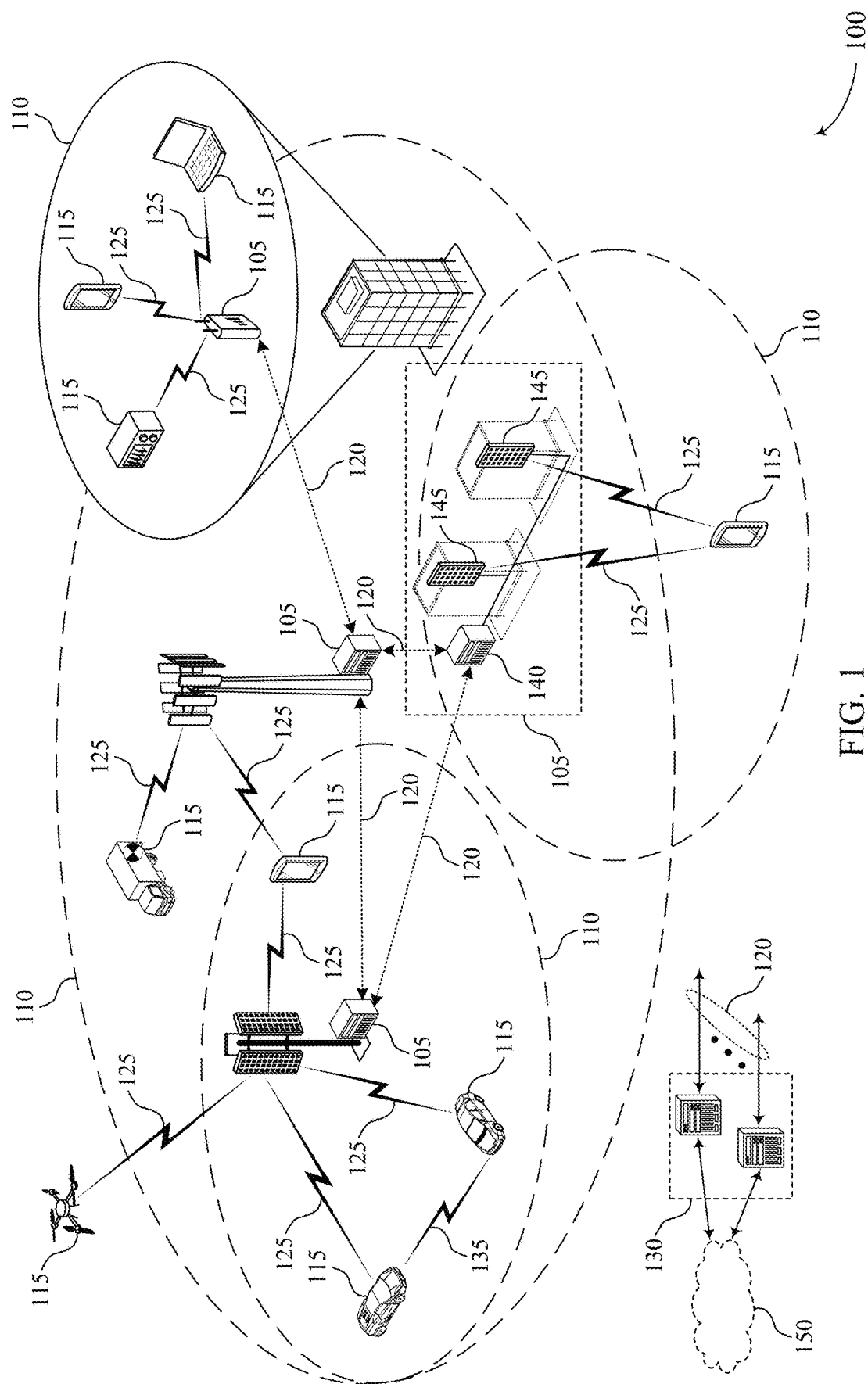
FIG. 1 illustrates an example of a wireless communications system that supports sidelink resource pool distribution in accordance with aspects of the present disclosure.

In some examples of a wireless communications system, a base station may communicate with one or more UEs via downlink and uplink signals. The UEs may also communicate with each other via one or more sidelinks. The base station may allocate shared resources for sidelink communications (such as, communications between user equipments (UEs)). The UEs may perform beam training procedures to determine one or more characteristics or parameters (such as directional beams) on which to communicate with each other, and the UEs may communicate with each other on sidelink communication links using shared resources (for example, resources from a pool of shared resources).

Various aspects generally relate to sidelink communications, and more specifically to determining shared resources associated with one or more UEs for sidelink communications, including control resources and data resources. A shared resource pool for the sidelink communications may, in some examples, include control resources and data resources. Control resources may be divided into control blocks (for example, control blocks each having a duration of 1 slot). For example, in a first portion of the slot for a control block, the control resources may be allocated for transmission of a sidelink request by a first UE. In a second portion of the slot, control resources may be allocated for transmission of one or more sidelink response messages. Various UEs that receive the sidelink request from the first UE may transmit one or more sidelink responses in the second portion of the slot. In a third portion of the slot, control resources may be allocated for a sidelink confirmation to be transmitted from the first UE that transmitted the sidelink request. The sidelink confirmation may indicate a reservation of the data resources requested in the sidelink request and may be based on one or more of the sidelink responses or alternatively may be based on a default action in the absence of receiving sidelink responses.

In some examples, the first UE may utilize a portion (for example, less than all) of the data resources for a data transmission). In such examples, the remaining data resources may remain unused, which may result in inefficient use of system resources, increased latency, among other examples.

In some examples, to more efficiently make use of available shared resources, UEs may reserve only portions (instead of the entirety) of the data resources. For example, a first UE may indicate, in a sidelink request, a set of data resources (for example, a subset of the data resources) for reservation. The sidelink request may include an indication of a portion (for example, a percentage, a fraction, a number of time resources, a number of frequency resources, or a number of spatial resources) of the data resources. In some examples, the sidelink request may include an indication of a determined segment of the shared resources (for example, a set of time resources, frequency resources, spatial resources, or any combination thereof). The second UE may respond with a positive sidelink response if the indicated data resources (for example, the portion of the resources, the segment of the resources, among other examples) are available. A third UE (for example, a non-target UE) may respond with a negative sidelink response if the indicated data resources (for example, the portion of the resources the segment of the resources, among other examples) are not available.

Particular aspects of the subject matter described herein may be implemented to realize one or more advantages. By segmenting or otherwise dividing the resources of a shared resource pool, the described techniques may support a more efficient use of available resources. Additionally, by segmenting the resources of the shared resource pool, UEs may experience increased power savings. The described techniques may also support improvements in system efficiency such that interference is decreased or otherwise avoided.

Aspects of the disclosure are initially described in the context of wireless communications systems. Aspects of the disclosure are further illustrated by and described with reference to resource allocation schemes, and shared resource segmentations. Aspects of the disclosure are further illustrated by and described with reference to apparatus diagrams, system diagrams, and flowcharts that relate to sidelink resource pool distribution.

FIG. 1 illustrates an example of a wireless communications system 100 that supports sidelink resource pool distribution in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier. In some examples, the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported. In some examples a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO). In some examples, multiple spatial layers are transmitted to the same receiving device, and multiple-user MIMO (MU-MIMO). In some examples, multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback. In some examples, the device may provide HARQ feedback in a specific slot for data received in a previous symbol in the slot. In other cases, the device may provide HARQ feedback in a subsequent slot, or according to some other time interval.

Various UEs 115 may communicate with each other over control resources to claim data resources. In some examples, the UEs 115 may only claim a portion of the available data resources. For example, a first UE 115 may transmit a sidelink request to a second UE 115 (for example, a target UE 115). The sidelink request may indicate a set of data resources or a defined segment of the data resources. The first UE 115 may monitor for sidelink responses from other UEs 115. For example, a second UE 115 (for example, a target UE 115) may transmit a positive sidelink response indicating that the requested set of resources or defined segment of resources is available for reservation, or may refrain from transmitting a positive sidelink response if the requested set of data resources of defined segment of the data resources is unavailable for reservation. A third UE 115 (for example, a non-target UE 115) may transmit a negative sidelink response indicating that the requested set of data resources or determined segment of the data resources is unavailable for reservation, or may refrain from transmitting a negative sidelink response if the data resources is available for reservation. If the first UE 115 determines that the requested set of data resources or determined segment of the data resources is available, then the first UE 115 may transmit a sidelink confirmation indicating the reserved data resources over which it will subsequently send a data transmission.

Figure 2:
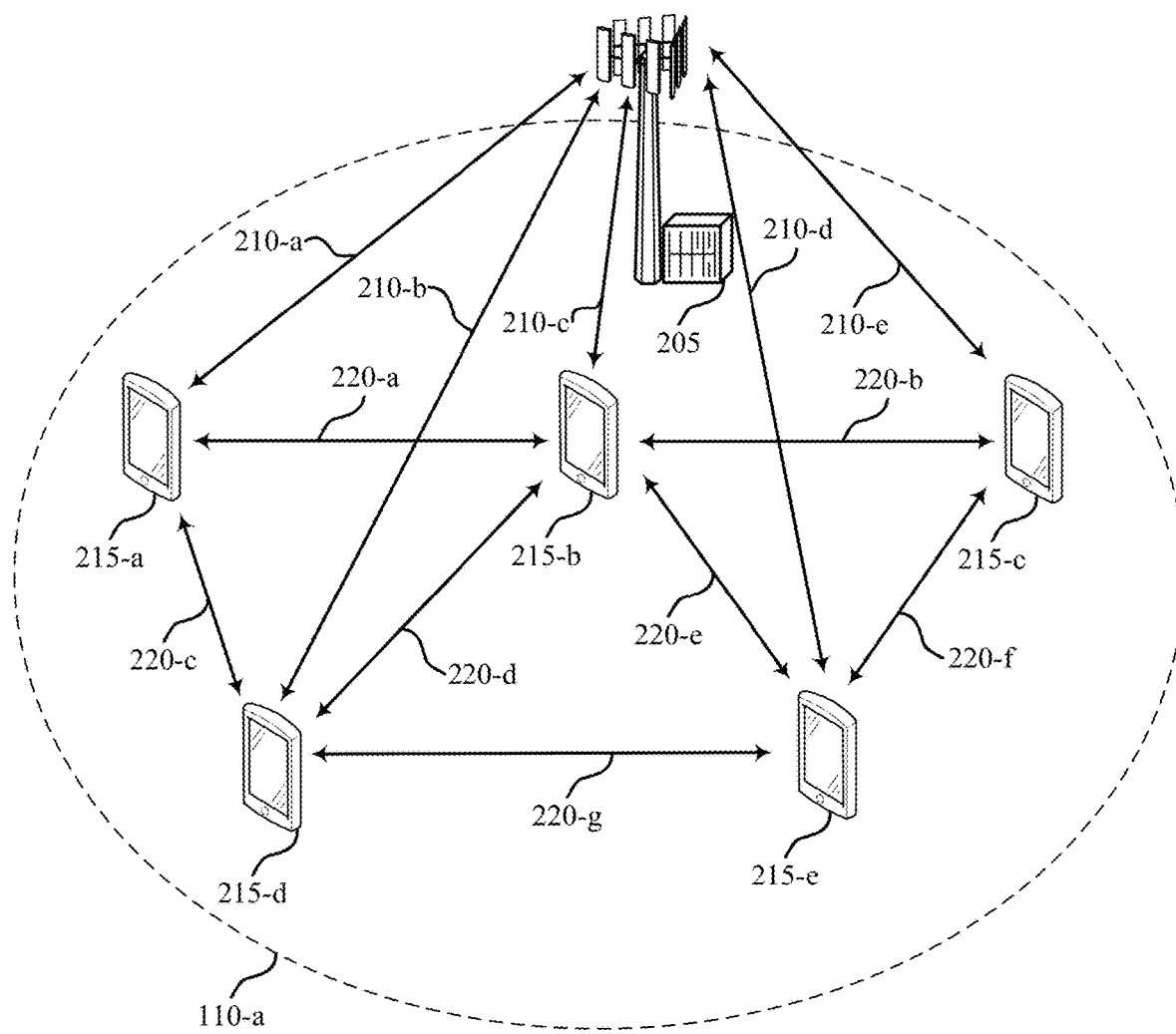
FIG. 2 illustrates an example of a wireless communications system that supports sidelink resource pool distribution in accordance with aspects of the present disclosure.

FIG. 2 illustrates an example of a wireless communications system 200 that supports sidelink resource pool distribution in accordance with aspects of the present disclosure. In some examples, wireless communications system 200 may implement aspects of wireless communications system 100.

A base station 205 may serve one or more UEs 215 located within a geographic area 110-a. For example, the base station 205 may serve the UE 215-a, the UE 215-b, the UE 215-c, the UE 215-d, or the UE 215-e. The UEs 215 may communicate with each other via one or more sidelink connections 220 (for example, the sidelink connection 220-a, the sidelink connection 220-b, the sidelink connection 220-c, the sidelink connection 220-d, the sidelink connection 220-e, the sidelink connection 220-f, or the sidelink connection 220-g). The base station 205 may communicate with the UEs 215 via one or more bidirectional communication links 210 (for example, the bidirectional communication link 210-a, the bidirectional communication link 210-b, the bidirectional communication link 210-c, the bidirectional communication link 210-d, or the bidirectional communication link 210-e).

In some examples, the base station 205 may allocate sidelink resources (for example, shared resources for sidelink communications between the UEs 215) to the UEs 215 via one or more of the bidirectional communication links 210. The shared resources may include data resources and control resources in some examples. The UEs 215 may communicate with each other (for example, via sidelink connections 220) to claim at least some of the data resources. The UEs 215 may split the data resources (for example, dynamically or as indicated by one or more other devices such as the base station 205) into sub-pools. In some examples, each sub-pool may be shared, may be different in size, or both, among other differences or similarities. In some examples, a UE 215 may claim a sub-pool of the data resources. The base station 205 may restrict the UEs 215 from claiming the entirety of a pool of shared resources, and may permit the UEs 215 to claim one or more sub-pools (for example, an overall subset) of the shared resources.

Other techniques for determining which of the UEs 215 will have access to data resources may result in system inefficiency. In some examples, the base station 205 may communicate with the UEs 215 via the bidirectional communication links 210 and may allocate one or more of the shared resources to one or more respective UEs 215 for each sidelink communication. Such sidelink communication allocation, however, may result in an unnecessary increase in signaling overhead and a decrease in system efficiency. In some examples, the UEs 215 may autonomously contend for data resources. In such examples, resources may be under-utilized (resulting in inefficient use of the data resources), or over-utilized (resulting in increased interference and failed transmissions, and decreased user experience). That is, if the UEs are configured to be overly cautious about avoiding collisions, or are not configured to make appropriate use of spatial resources (for example, beamforming techniques), then otherwise-available resources may remain unused. Additionally, or alternatively, if too many UEs are concurrently transmitting on the same shared resources (for example, on the beams that interfere with each other), then link quality may degrade, which may result in one or more of failed transmissions, multiple retransmissions, increased system latency, or other problems. To increase system efficiency and decrease interference, among other advantages, the UEs may dynamically claim shared resources, for example, according to a schedule, and may communicate with each other to determine and decrease interference while making efficient use of available shared resources.

The UEs 215 may determine a priority schedule, which may determine an order in which the UEs 215 may take turns attempting to claim data resources. The UEs 215 may communicate with each other, autonomously (for example, without formal scheduling by the base station 205), using control resources according to the priority schedule. In some examples, the base station 205 may transmit, to the UEs 215, an indication of the priority schedule. In some examples, the UEs 215 may dynamically determine the priority schedule (for example, without receiving an indication of the priority schedule from the base station).

The control resources may include resources allocated for signal types. For example, the UEs 215 may determine (for example, via preconfigured information or signaling from the base station 205), resources for sidelink request messages, positive sidelink response and negative sidelink response messages, and sidelink confirmation messages, as described with reference to greater detail with respect to FIG. 3. The control resources may include multiple portions of resources, which may be referred to as control blocks. Each control block in the control resources may include resources for one or more of a sidelink request message, a positive sidelink response message, a negative sidelink response message, or a sidelink confirmation. A UE 215 that is scheduled, according to the priority schedule, for a particular control block may transmit a sidelink request message to a target UE 215 over the control block. The sidelink request message may indicate that the UE 215 intends to transmit a data message over a portion of the shared resources.

If a UE 215 was scheduled to receive a data transmission over a portion of the data resources from a previous control block, then that the UE 215 may have priority and may be able to object to the transmission being scheduled in the current control block. For instance, over a first control block, the UE 215-*a* may communicate with UE 215-*b*, and may determine to send a data transmission using a portion of the data resources. The UE 215-*b* may receive the data transmission from the UE 215-*a* using a first receive beam. Over a second control block, the UE 215-*d* may be scheduled according to the priority schedule, and may transmit a sidelink request message to the UE 215-*e*. The UE 215-*e* may receive the sidelink request message using a second receive beam. If the UE 215-*e* is available for the transmission, then the UE 215-*e* may transmit a positive sidelink response message. However, the UE 215-*b* may be monitoring, using the first receive beam, over the second control block, and may receive the sidelink request message on the first receive beam. The UE 215-*b* may determine that a data transmission from the UE 215-*d* to the UE 215-*e* may interfere with the previously scheduled data transmission on the first receive beam. In such examples, because the UE 215-*a* is a higher priority UE 215 than the UE 215-*d* (for example, because UE 215-*a* scheduled UE 215-*b* for a data transmission over a previous control block), the UE 215-*b* may transmit a negative sidelink response message. The UE 215-*d* may receive the negative sidelink response message, and may determine to abort or refrain from transmitting the data transmission to the UE 215-*e*.

In some examples, to efficiently use the data resources in a shared data resource pool, the UEs 215 may indicate sets of resources or segments of the shared data resource pool for reservation. For example, the UE 215-*d* may transmit a sidelink request indicating a set of data resources (for example, a fraction, percentage, or number of available time resources of the data resources, frequency resources of the data resources, spatial resources of the data resources, or any combination thereof) or a defined segment of the shared data resource pool. The UE 215-*e* may transmit a positive sidelink response if the indicated set of data resources or segment of the shared data resource pool is available, for example, for a data transmission. One or more other UEs 215 may transmit one or more negative sidelink responses indicating data resources or segments of the shared data resource pool that are unavailable. If the indicated set of data resources or segments of the shared data resource pool are available for data transmission, then the UE 215-*d* may transmit a sidelink confirmation indicating specific time, frequency, or spatial resources (or any combination thereof) for reservation.

Figure 3:
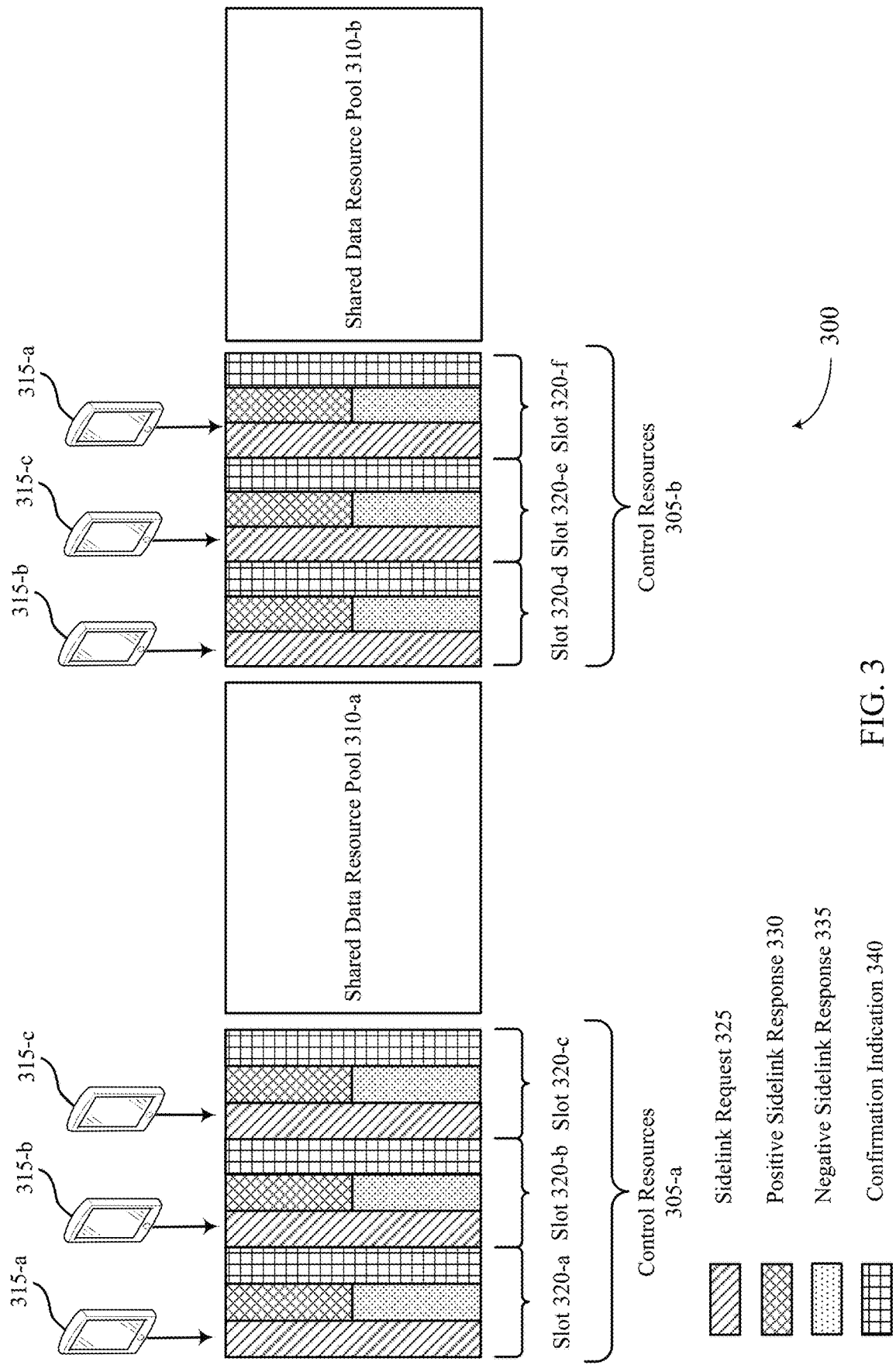
FIG. 3 illustrates an example of a resource allocation scheme that supports sidelink resource pool distribution in accordance with aspects of the present disclosure.

Examples of control signaling over various control blocks is described in greater detail with respect to FIG. 3. Various signaling scenarios between different UEs 215 are described in greater detail with respect to FIGS. 4-7.

FIG. 3 illustrates an example of a resource allocation scheme 300 that supports sidelink resource pool distribution in accordance with aspects of the present disclosure. In some examples, resource allocation scheme 300 may implement aspects of wireless communications systems 100 and 200.

In some examples, multiple UEs 315 may communicate with each other (for example, via one or more sidelink connections). A base station 105 may allocate shared resources to one or more of the UEs 315. The shared resources may include control resources 305 and shared data resource pools 310. The UEs 315 may determine which UE 315 will transmit and receive in the shared data resource pools 310 without additional signaling from a base station 105, and may increase the number of transmissions in the shared data resource pools 310 while decreasing interference, among other advantages. The UEs 315 may perform beam training procedures to determine which transmit and receive beams to use for communicating with each other. The UEs 315 may utilize these beams while transmitting control signals, as described in greater detail with reference to FIGS. 4-7.

The UEs 315 may communicate with each other on the control resources 305 to claim data resources from the shared data resource pools 310. The control resources may include one or more control blocks. Each control block may have a duration (for example, 1 slot). Each control block may include resources allocated for communicating different types of signals. For example, each control block may include resources allocated for one or more of a sidelink request 325 (which may also be referred to as a sidelink request), a positive sidelink response 330 (which may also be referred to as a positive sidelink response), a negative sidelink response 335 (which may also be referred to as a negative sidelink response), or a sidelink confirmation 340 (which may also be referred to as a sidelink confirmation). A UE 315 may transmit a sidelink request 325 to a target UE 315 to claim data resources for data transmissions. A sidelink request 325 may include a UE identifier for the target UE 315. The other UEs 315 may monitor for the sidelink request 325 (for example, to determine whether the other UEs 315 are the target UE 315 or to determine if a data transmission from the sidelink request transmitting UE 315 will cause interference above a threshold to a previously scheduled data transmission).

A target UE 315 may transmit a positive sidelink response 330 in response to a sidelink request 325 to accept a data transmission. A target UE 315 may transmit a positive sidelink response message if it determines that it is not already scheduled to receive a data transmission or if a higher priority transmission will not cause interference above a threshold, among other examples. A non-target UE 315 may transmit a negative sidelink response 335 in response to a sidelink request 325 to object to a data transmission between the UE 315 that transmitted the sidelink request 325 and the target UE 315. The non-target UE 315 may transmit a negative sidelink response 335, for example, if a data transmission from the UE 315 that transmitted the sidelink request 325 will interfere with a previously scheduled data transmission for the non-target UE. A positive sidelink response 330 and a negative sidelink response 335 may occupy a same time (for example, may overlap time resources over a portion of a slot 320) and may occupy different frequency tones.

A UE 315 that transmitted a sidelink request 325 may transmit a sidelink confirmation 340 to confirm a scheduled data transmission or may refrain from transmitting a sidelink confirmation 340 to indicate that a data transmission has been aborted or refrained from being performed. In some examples, if the UE 315 receives a positive sidelink response 330 from the target UE 315 and no negative sidelink response 335, then it may transmit the sidelink confirmation 340. In some examples, if the UE 315 does not receive a positive sidelink response 330 from the target UE 315, or if the UE 315 receives one or more negative sidelink responses 335 from one or more other UEs 315, (or if both occur), then the UE 315 may refrain from transmitting the sidelink confirmation message.

The UEs 315 may take turns, according to the priority schedule, attempting to claim data resources form a shared data resource pool 310 over corresponding control resources 305. At least some, if not all, of the UEs 315 may be aware of the priority schedule, and may thus monitor, transmit, or receive, or any combination thereof over the resources allocated for the control signals over respective control blocks.

In some examples, a base station 105 may transmit a downlink indication of the priority schedule. For example, the priority schedule may indicate that UE 315-a is assigned a control block over a slot 320-a of control resources 305-a, that UE 315-b is assigned a control block over a slot 320-b of control resources 305-a, and that UE 315-c is assigned a control block over a slot 320-c of control resources 305-a. One or more of the UEs 315 may only attempt to claim data resources from the shared data resource pool 310-a over their respective assigned control blocks. That is, over the slot 320-a, the UE 315-a may transmit a sidelink request 325, but UE 315-b and UE 315-c may refrain from or may be prohibited from transmitting sidelink request messages over the slot 320-a. Similarly, the UE 315-b may transmit a sidelink request 325 over the slot 320-b and UE 315-c may transmit a sidelink request 325 over the slot 320-c. The same downlink indication of the priority schedule, or a new indication of a priority schedule, may indicate assignments for control resources 305-a, or may include a pattern or set of rules for subsequent control resources (for example, a rotation schedule, a round robin rule, among other examples).

For instance, the downlink indication may indicate that UE 315-b is assigned a control block over a slot 320-d of control resources 305-b, that UE 315-c is assigned a control block over a slot 320-e of control resources 305-b, and that UE 315-a is assigned a control block over a slot 320-f of control resources 305-b. In some examples, the UEs 315 may communicate according to the priority schedule across multiple control resources 305 until the base station 105 transmits a new indication (for example, including a new or updated priority schedule). In some examples, the base station may transmit a new indication of a priority schedule prior to each set of control resources 305-b.

In some examples, the UEs 315 may determine the priority schedule without input from the base station 105. For instance, the UEs 315 may determine a rotating priority schedule. In some examples, the UE 315-a is assigned the first slot (for example, the slot 320-a) of a first set of control resources 305-a, the third slot (for example, slot 320-f) of a second set of control resources 305-b, the second slot of a subsequent set of control resources 305-c (not shown), and so on across multiple sets of control resources 305-a.

A UE 315 that is assigned a control block that is earlier than another control block may have a higher priority than a UE 315 that is assigned to a later control block. That is, the UE 315-a may have a higher priority than the UE 315-b, and if the UE 315-a is scheduled for a transmission over the slot 320-a, then the UE 315-a or a UE 315 scheduled to communicate with the UE 315-a may object to a transmission scheduled by the UE 315-b over the slot 320-b.

The UEs 315 may attempt to claim data resources from the shared data resource pools 310 according to the priority schedule. For example, the UE 315-a may transmit, according to the priority schedule, a sidelink request 325 over a first portion of the slot 320-a. The UE 315-a may transmit the sidelink request 325 to a target UE 315 (for example, the UE 315-c). In some examples, the UE 315-b and the UE 315-c may direct respective receive beams toward the UE 315-a based on the priority schedule, among other factors. The sidelink request 325 may include an indication of a set of data resources of the shared data resource pool 310-a. The set of data resources may include a fraction of the shared data resource pool 310-a, a percentage of the shared data resource pool 310-a, a number of resources of the shared data resource pool 310-a, or any combination thereof.

For instance, the sidelink request 325 may include an indication of half of the shared data resource pool 310-a that is requested to be reserved (for example, a half of the available data resources or a specific set within the data resources such as the first half, the middle half, or the last half of the data resources). In some examples, the sidelink request 325 may include a time or a priority indication (for example, as an indication of a preference for or request for a specific portion (for example, half) of the shared data resource pool 310-*a*). In some examples, the sidelink request 325 may include simply an indication of a fraction or a percentage (for example, half of the shared data resource pool 310-*a*) without an indication of a preference for or request for the set of data resources in the shared data resource pool 310-*a* the indicated fraction or percentage will be located. That is, the indicated half of the shared data resource pool 310-*a* could be located in the first half of the shared data resource pool 310-*a*, the second half of the shared data resource pool 310-*a*, or in the middle of the shared data resource pool 310-*a* (for example, after a first quarter of the shared data resource pool 310-*a* and prior to a final quarter of the shared data resource pool 310-*a*). Additionally, or alternatively, the half of the shared data resource pool 310-*a* for reservation could be located in different two sets (for example, two quarters) that may or may not be contiguous within the shared data resource pool 310-*a*.

The UE 315-*c* may receive the sidelink request 325 over the first portion of the slot 320-*a* and may transmit a positive sidelink response 330 over the second portion of the slot 320-*a* if the UE 315-*c* has at least half of the shared data resource pool 310-*a* is available for a data transmission. The UE 315-*b* may also receive the sidelink request 325 over the first portion of the slot 320-*a*. If the UE 315-*b* determines that it does not have a conflicting data transmission schedule, among other conditions, during at least half of the shared data resource pool 310-*a*, then UE 315-*b* may refrain from transmitting a negative sidelink response 335 over the second portion of the slot 320-*a*. For example, the UE 315-*b* may have a data transmission from another UE 315 (or another device) scheduled during the second half of the shared data resource pool 310-*a*. The UE 315-*b* may transmit a negative sidelink response 335 indicating the second half of the shared data resource pool 310-*a* as unavailable. In such examples, the UE 315-*a* may transmit a sidelink confirmation 340 indicating a reservation of the first half of the shared data resource pool 310-*a*. Or, in some examples, the UE 315-*b* may have a data transmission from another UE 315 scheduled during some (for example, over half of the shared data resource pool 310-*a* such that half of the shared data resource pool 310-*a* is not available) or all of the shared data resource pool 310-*a*, and the UE 315-*b* may transmit a negative sidelink response 335. In such examples, the UE 315-*a* may refrain from transmitting a sidelink confirmation 340.

Over the third portion of the slot 320-*a*, if the UE 315-*a* has received the positive sidelink response 330 from the UE 315-*c*, and having received no negative sidelink response 335 from any of the other UEs 315 (such as the UE 315-*b*), the UE 315-*a* may transmit a sidelink confirmation 340 to UE 315-*c* indicating the set of resources or segment of the shared data resource pool 310-*a* for reservation. The UE 315-*c* may thus be scheduled to receive a data transmission on a set or portion of data resources from the shared data resource pool 310-*a* on the same receive beam on which it received the sidelink request 325 and the sidelink confirmation 340.

If the UE 315-*a* does not receive a positive sidelink response 330 or a negative sidelink response 335, then the UE 315-*a* may fall back on a default behavior. For example, the UE 315-*a* may determine (for example, based on having not received a positive sidelink response 330) that the UE 315-*c* is unavailable for a data transmission during the shared data resource pool 310-*a*. In such examples, the UE 315-*a* may refrain from transmitting a sidelink confirmation 340. In such examples, the UE 315-*a* may also refrain from transmitting a data transmission for a particular duration. For example, the UE 315-*a* may not send a data transmission during shared data resource pool 310-*a*, but may compete for shared data resource pool 310-*b* during control resources 305-*b*.

Over the slot 320-*b*, the UE 315-*b* may attempt to schedule a data transmission with a fourth UE 315 (not shown). The UE 315-*b* may transmit a sidelink request 325 to the fourth UE 315 over the first portion of the slot 320-*b*. The sidelink request 325 may include an indication of a set of resources or segment of the shared data resource pool 310-*a* (for example, the entirety of the shared data resource pool 310-*a*). Over the second portion of the slot 320-*b*, the fourth UE may transmit a positive sidelink response 330 to the UE 315-*b*. The UE 315-*c* may monitor, over the second portion of the slot 320-*b*, for the sidelink request 325 from the UE 315-*b* using the same receive beam on which UE 315-*a* scheduled the data transmission over the slot 320-*a*. If the UE 315-*c* receives the sidelink request 325 from the UE 315-*b* over the slot 320-*b* on that beam, then the UE 315-*c* may measure interference, among other aspects, of the potential data transmission from the UE 315-*b* to the fourth UE on the that receive beam. If the interference is above a threshold (for example, will create a relatively low signal to interference plus noise ratio (SINR) on that receive beam), then the UE 315-*c* may object to the scheduling of a data transmission over the entirety of the shared data resource pool 310-*a* between UE 315-*b* and the target UE 315 of the slot 320-*b* (for example, because UE 315-*a* has already scheduled a data transmission during half of the shared data resource pool 310-*a*). That is, the UE 315-*c* may transmit a negative sidelink response 335 over the slot 320-*b* because UE 315-*c* was scheduled by the UE 315-*a*, which has a higher priority than the UE 315-*b*. Upon receiving the negative sidelink response 335 over the second portion of the slot 320-*b*, the UE 315-*b* may abort the data transmission, and may refrain from transmitting a sidelink confirmation 340 over the third portion of the slot 320-*b*.

The other UE 315 that received the sidelink request 325 over the slot 320-*b* may determine that no data transmission is scheduled based on not receiving the sidelink confirmation 340 over the third portion of the slot 320-*b*. Any of the UEs 315 that have successfully scheduled a data transmission (for example, the UE 315-*a*) may perform the data transmission using claimed data resources from the shared data resource pool 310-*a*. Over control resources 305-*b*, the UEs 315 may claim data resource from the shared data resource pool 310-*b* according to the priority schedule.

A UE 315 may determine, based on one or more beam training procedures, which one or more beams to use to communicate with other UEs 315. For instance, over a control block, if a UE 315 is not scheduled to receive any data transmissions, then it may monitor for a sidelink request 325 by training its receive beam on the UE 315 that is scheduled to transmit a sidelink request 325, for example, according to the priority schedule. That is, the UE 315-*b* and the UE 315-*c* may both direct their receive beams to receive a sidelink request 325 from the UE 315-*a*, for example, according to a previously performed beam training procedure. The UE 315-*b* and the UE 315-*c* may thus determine, by receiving the sidelink request 325 over the slot 320-*a*, whether each is the target UE 315.

If a UE 315 is already scheduled to receive a data transmission on a receive beam, then it may monitor for sidelink request 325 using that receive beam. For example, if the UE 315-*a* schedules UE 315-*c* over the slot 320-*a* for a data transmission on a first receive beam, then the UE 315-*c* may monitor for subsequent sidelink request 325 over control resources 305-*a* on the first receive beam. By monitoring for sidelink request 325 using the first receive beam, the UE 315-*c* may determine whether potential subsequently schedulable data transmissions will interfere with the previously scheduled data transmission using the first receive beam. The UE 315-*c* may determine whether to transmit a negative sidelink response 335 based on monitoring for sidelink request 325 on the first receive beam, among other actions.

Figure 4:
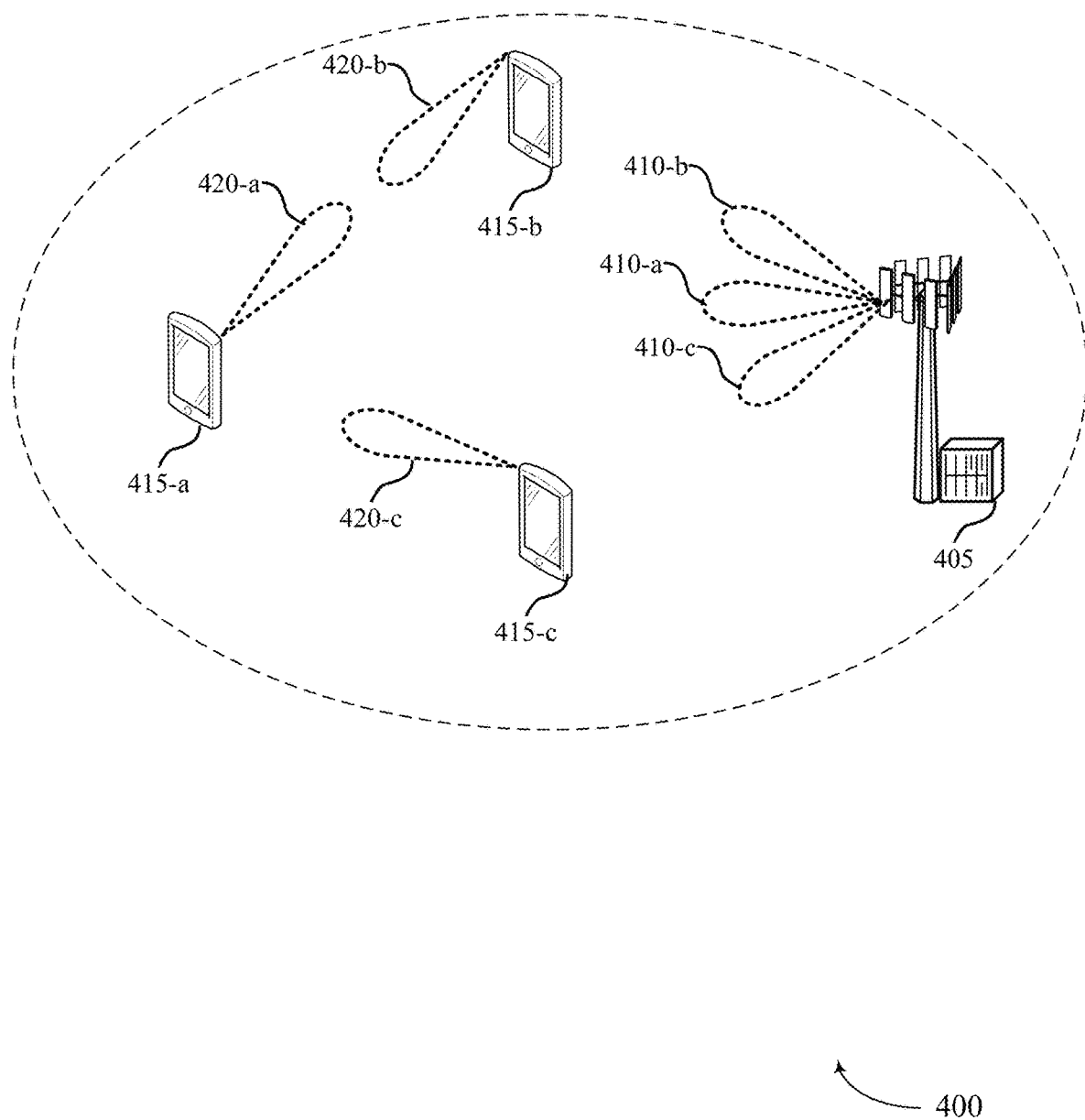
FIG. 4 illustrates an example of a wireless communications system that supports sidelink resource pool distribution in accordance with aspects of the present disclosure.

FIG. 4 illustrates an example of a wireless communications system 400 that supports sidelink resource pool distribution in accordance with aspects of the present disclosure. In some examples, wireless communications system 400 may implement aspects of wireless communications systems 100 and 200.

In some examples, a base station 105-*a* may communicate with one or more of the UEs 415. The base station 405 may transmit downlink signals on one or more beams 410. For example, the base station 405 may communicate with the UE 415-*a* on the beam 410-*a*, may communicate with the UE 415-*b* on the beam 410-*b*, and may communicate with the UE 415-*c* on the beam 410-*c*. In some examples, the base station 405 may allocate shared resources for sidelink communication among one or more of the UEs 415. The shared resources may include control resources, including multiple control blocks, and data resources, as described with reference to FIG. 3. The UEs 415 may determine a priority schedule that indicates which UE 415 may attempt to claim the data resources over each control block of the control resources. The base station 405 may transmit the priority schedule to the UEs 415, or alternatively the UEs 415 may determine the priority scheduled autonomously or based on a preconfigured priority schedule, among other examples, as described with reference to greater detail with respect to FIG. 3. The UEs 415 may perform one or more beam training procedures, to determine which beams 420 to use for communicating with each other. For instance, the UE 415-*b* may determine which beam 420 to use to communicate with each of the UE 415-*a* and the UE 415-*c*. To communicate with the UE 415-*a*, the UE 415-*b* may use the beam 420-*b* to receive sidelink transmissions from the UE 415-*a* or transmit sidelink communications to the UE 415-*a*.

In some examples, the UEs 415 may use their beams 420 based on a priority schedule. For example, the UEs 415 may determine, according to a priority schedule, that the UE 415-*a* is scheduled to attempt to claim the data resources over a control block (for example, over a slot in the control resources). Based on the priority schedule, the UE 415-*b* may use the beam 420-*b* to receive a sidelink request from the UE 415-*a*, and to determine whether it is the target UE 415 of the UE 415-*a*. The UE 415-*c* may be available for data transmissions using the part or all of the data resources (for example, may not have been scheduled previously by another UE 415). The UE 415-*c* may train beam 420-*c* on the UE 415-*a* according to the priority schedule, and may use the beam 420-*c* to receive signals from the UE 415-*a*, and to determine whether it is the target UE 415 of the UE 415-*a*.

The UE 415-*a* may attempt to schedule a sidelink data transmission to the UE 415-*b* during scheduled control block (for example, a slot in the control resources). The UE 415-*a* may use the beam 420-*a* to communicate with the UE 415-*b* (for example, based on the beam training procedure). During the first portion of the slot, the UE 415-*a* may transmit to the UE 415-*b*, on the beam 420-*a*, a sidelink request to reserve a set of the data resources. For example, the sidelink request may indicate a set (for example, half) of time resources, frequency resources, spatial resources, or any combination thereof, of the data resources for reservation. In some examples, the sidelink request may not include an indication of which data resources are requested for reservation, but may instead indicate an amount or number of resources requested for reservation (for example, half of the data resources regardless of the position or the location of the resources). In some examples, the sidelink request may include an identifier, for example, a UE 415 identifier, indicating which UE 41 (for example, the UE 415-*b*), is the target UE 415. The UE 415-*b* may receive the sidelink request on the beam 420-*b* and may determine that it is the target UE 415. If the UE 415-*b* does not have a conflicting transmission scheduled by another UE 415, among other alternative operations or conditions, and if the UE 415-*b* does not sense interference from another UE 415 on the beam 420-*b* above a threshold, then the UE 415-*b* may transmit, on the beam 420-*b*, a positive sidelink response (for example, indicating a positive response to the sidelink request). The positive sidelink response may indicate available data resources. For example, if the UE 415-*b* is scheduled with a conflicting transmission during a portion of data resources (for example, during a first quarter of the data resources with respect to time and during the last quarter of the data resources with respect to time), then the positive sidelink response may specify particular available data resources (for example, half of the data resources subsequent two the first quarter of the data resources and prior to the final quarter of the data resource). The UE 415-*c* may also monitor for the sidelink request on the beam 420-*c* over the first portion of the slot.

In some examples, (for example, based on the direction of beam 420-*a*), the UE 415-*c* may not receive the sidelink request. In such examples, over the second portion of the slot, the UE 415-*c* may refrain from transmitting a sidelink response (for example, a negative sidelink response). In some examples, the UE 415-*c* may receive the sidelink request over the first portion of the slot. In such examples, the UE 415-*c* may determine that it is not the target UE 415 (for example, based on the UE 415 identifier included in the sidelink request). The UE 415-*c* may determine that it does not object to a data transmission from the UE 415-*a* on the beam 420-*a* (for example, because the UE 415-*c* is not already scheduled to receive a data transmission over the set of data resources or because a data transmission on the beam 420-*a* will not cause interference above a threshold for the UE 415-*c*). Upon determining that it does not object to a data transmission over the set of data resources on the beam 420-*a*, the UE 415-*c* may refrain from transmitting a negative sidelink response to the UE 415-*a* on the beam 420-*c* over the second portion of the slot.

The UE 415-*a* may determine whether to send a data transmission based on monitoring for sidelink responses from other UEs 415. For example, the UE 415-*a* may monitor for sidelink responses from the other UEs 415 over the second portion of the slot on the beam 420-*a*. As described with respect to FIG. 4, the UE 415-*a* may receive the positive sidelink response from the UE 415-*b* indicating that half of the data resources (for example, located in the middle of the shared data resource pool) are available for a data transmission, and may not receive a negative sidelink response from the UE 415-*c*.

Based on these responses, the UE 415-*a* may determine that the UE 415-*b* is available for a data transmission over a set of resources, and that no other UEs 415 (for example, the UE 415-*c*) object to the data transmission on the beam 420-*a*. In such examples, the UE 415-*a* may transmit a sidelink confirmation of the reservation of the data resources over a third portion of the slot on the beam 420-*a* to the UE 415-*b*. The sidelink confirmation may indicate the data resources for reservation (for example, half of the data resources subsequent to the first quarter of the data resources and prior to the final quarter of the data resources based on the positive sidelink response). The UE 415-*b* may receive the sidelink confirmation and may determine that the data transmission requested in the sidelink request is confirmed for the specific data resources indicated in the sidelink confirmation. After the control resources that correspond to a set of data resources are over, the UE 415-*a* may transmit the data transmission to the UE 415-*b* using the reserved set of the data resources. The UE 415-*b* may monitor for the data transmission using beam 420-*b* and may successfully receive the data transmission. The UE 415-*c* may also monitor for the sidelink confirmation on the beam 420-*c*. If the UE 415-*c* receives the sidelink confirmation, it may determine that the set of the data resources is successfully reserved, and may account for this information over one or more subsequent control blocks.

Figure 5:
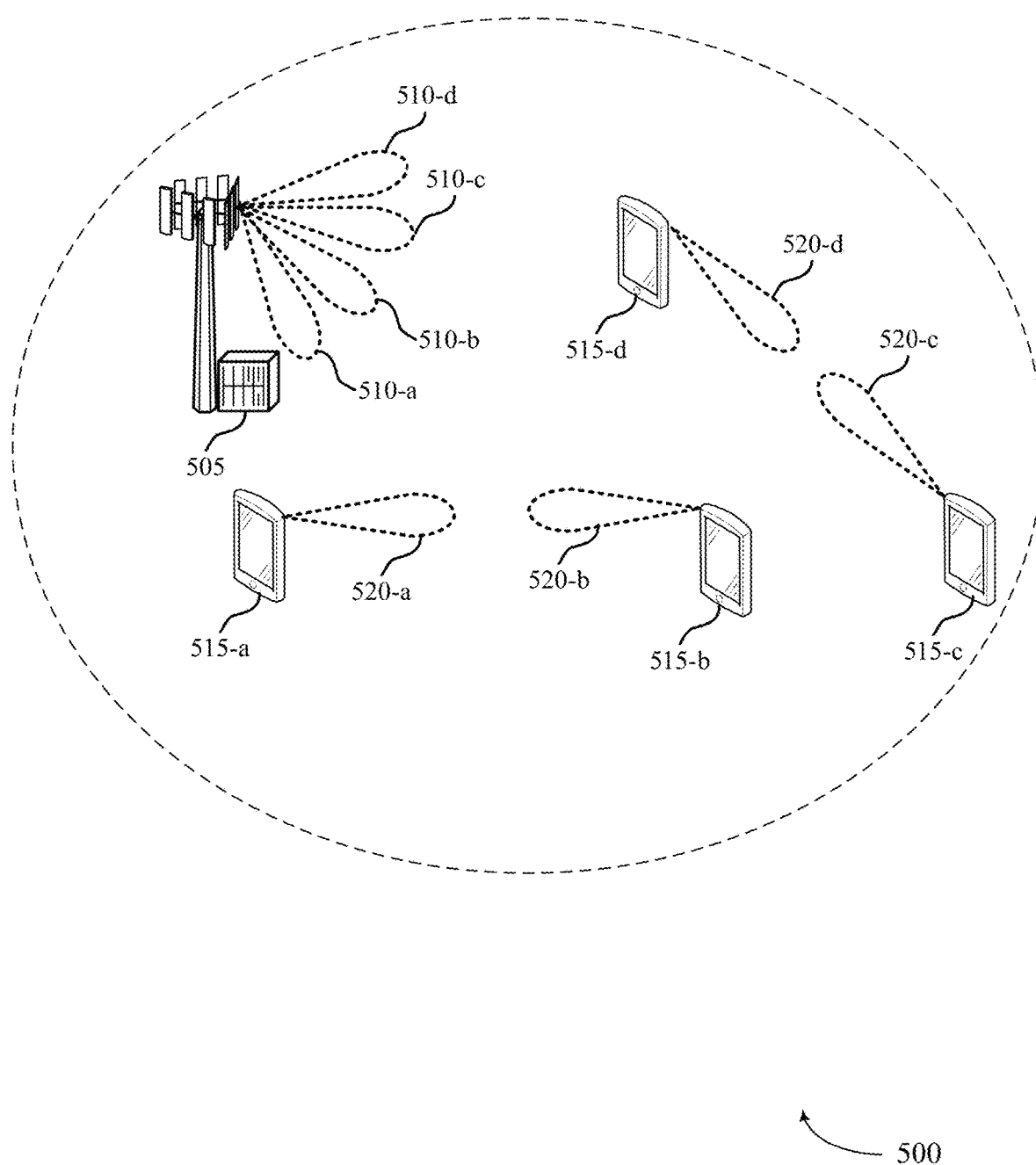
FIG. 5 illustrates an example of a wireless communications system that supports sidelink resource pool distribution in accordance with aspects of the present disclosure.

FIG. 5 illustrates an example of a wireless communications system 500 that supports sidelink resource pool distribution in accordance with aspects of the present disclosure. In some examples, wireless communications system 500 may implement aspects of wireless communications systems 100, 200, and 400.

In some examples, a base station 505 may communicate with one or more of the UEs 515. The base station 505 may transmit downlink signals on one or more beams 510. For example, the base station 505 may communicate with the UE 515-*a* on the beam 510-*a*, may communicate with the UE 515-*b* on the beam 510-*b*, may communicate with the UE 515-*c* on the beam 510-*c*, and may communicate with the UE 515-*d* on the beam 510-*d*. In some examples, the base station 505 may allocate shared resources for sidelink communication among the UEs 515. The shared resources may include control resources, including multiple control blocks, and data resources, as described with reference to greater detail with respect to FIG. 3. The UEs 515 may determine a priority schedule that indicates which UE 515 may attempt to claim the data resources over each control block of the control resources. The base station 505 may transmit the priority schedule to the UEs 515, or the UEs 515 may determine the priority scheduled autonomously or based on a preconfigured priority schedule, among other examples, as described with reference to greater detail with respect to FIG. 3. The UEs 515 may perform one or more beam training procedures, to determine which beams 520 to use for communicating with each other. For instance, the UE 515-*b* may determine which beam 520 to use to communicate with each of the UE 515-*a*, the UE 515-*c*, and the UE 515-*d*. To communicate with the UE 515-*a*, the UE 515-*b* may use the beam 520-*b* to receive sidelink transmissions from the UE 515-*a* or transmit sidelink communications to the UE 515-*a*.

In some examples, the UEs 515 may use or direct their beams 520 based on a priority schedule, or previously scheduled transmissions, or both. For instance, the UEs 515 may determine, according to a priority schedule, that the UE 515-*a* is scheduled to attempt to claim the data resources over a control block (for example, over a slot in the control resources). Based on the priority schedule, the UE 515-*b* may use the beam 520-*b* trained on the UE 515-*a*, to determine whether it is the target UE 515 of the UE 515-*a*. The UE 515-*c* may be scheduled to receive another data transmission from the UE 515-*d* on the beam 520-*c*. That is, during a previous slot, the UE 515-*d* may have transmitted a sidelink request on the beam 520-*d* for reserving half of the data resources. The UE 515-*c* may have received the sidelink request and may have transmitted a positive sidelink response to the UE 515-*d* on the beam 520-*c* indicating that all of the data resource are available for transmission to the UE 515-*c* on beam 520-*c*. The UE 515-*d* may have transmitted a sidelink confirmation to the UE 515-*c* on the beam 520-*d* reserving the first half of the data resources. Thus, over the current slot, the UE 515-*c* may maintain beam 520-*c* directed towards the UE 515-*d* and may monitor for a sidelink request (for example, from the UE 515-*a*) on the beam 520-*c*.

The UE 515-*b* may receive, during a first portion of the slot, the sidelink request to reserve a set of the data resources from the UE 515-*a* and may determine that it is available for a data transmission over the set of data resources. For example, the sidelink request may indicate half of the data resources for reservation, and the UE 515-*b* may determine that it is available for the entirety of the data resources to receive a data transmission on beam 520-*b*. In such examples, during a second portion of the slot, the UE 515-*b* may transmit a positive sidelink response to the UE 515-*a* on the beam 520-*b*. The positive sidelink response may indicate the entirety of the data resources as available for a data transmission. Then, the UE 515-*b* may continue to monitor, over a third portion of the slot on the beam 520-*b*, for a sidelink confirmation indicating a reservation of the set of the data resources.

The UE 515-*c* may determine whether a potential transmission from the UE 515-*a* on the beam 520-*a* to the UE 515-*b* will cause interference above a threshold on the beam 520-*c* with the data transmission previously scheduled by UE 515-*d*. That is, the UE 515-*c* may monitor for the sidelink request from the UE 515-*a* using beam 520-*c*, and may perform one or more measurements to determine a level of interference on the beam 520-*c*. If the UE 515-*a* successfully reserves the set of the data resources for a data transmission to the UE 515-*b* using beam 520-*a*, then the UE 515-*a* will transmit the scheduled data transmission to the UE 515-*b* using the same beam 520-*a*. If the sidelink request on the beam 520-*a* is received at the UE 515-*c* on the beam 520-*c* with a signal power that is above a threshold, then a potential data transmission from the UE 515-*a* to the UE 515-*b* on the beam 520-*a* may also cause interference above a threshold for the UE 515-*c* on the beam 520-*c* while the UE 515-*c* is receiving a data transmission from the UE 515-*d*. However, the UE 515-*d* may have previously scheduled a data transmission on the first half of the data resources. Because the previously scheduled data transmission may have a higher priority (for example, according to the priority scheduled), the UE 515-*c* may object to the data transmission from the UE 515-*a* to the UE 515-*b* if it will interfere with the previously scheduled data transmission from the UE 515-*d*.

If the measured interference level is above the threshold, then the UE 515-*c* may determine that a data transmission from the UE 515-*a* on the beam 520-*a* might interfere with the previously scheduled data transmission from the UE 515-*d* to a sufficient degree causing an adjustment (for example, the interference level will degrade the previously scheduled data transmission). That is, a data transmission from the UE 515-*a* to the UE 515-*b* during the first half of the data resources may conflict with the previously scheduled data transmission during the same portion of the data resources from the UE 515-*d* to the UE 515-*c*. In such examples, the UE 515-*c* may transmit a negative sidelink response to the UE 515-*a*. The negative sidelink response may indicate that a specific set of the data resources (for example, the first half of the data resources) are not available for a data transmission from the UE 515-*a* to the UE 515-*b*. As a result, the negative sidelink response may cause that the UE 515-*a* will not use the first half of the data resources for a data transmission to the UE 515-*b*. In some examples, the UE 515-*c* may transmit the negative sidelink response to the UE 515-*a* on the beam 520-*c*. In some examples, the UE 515-*c* may transmit the negative sidelink response on another beam 520 (for example, a beam that is directed toward the UE 515-*a* to increase the likelihood that the UE 515-*a* will receive the negative sidelink response).

The UE 515-*a* may determine whether to transmit the data transmission to the UE 515-*b* based on monitoring for sidelink responses from other UEs 515. Over the second portion of the slot, the UE 515-*a* may monitor for the sidelink responses from the other UEs 515. The UE 515-*a* may receive, on the beam 520-*a* from the UE 515-*b*, a positive sidelink response indicating that the UE 515-*b* is available and able to receive the data transmission on the beam 520-*b* (for example, during any or all of the data resources). If the UE 515-*c* determines that the data transmission will not interfere with the previously scheduled data transmission from the UE 515-*d* on the beam 520-*c* above a threshold, the UE 515-*c* may refrain from transmitting a negative sidelink response. In such examples, the UE 515-*a* may transmit, on the beam 520-*a*, a sidelink confirmation indicating reservation of the set of data resources. Having received no negative sidelink response from any of the other UEs 515, the UE 515-*a* may transmit a sidelink confirmation indicating reservation of any of the data resources (for example, a first half of the data resources, a second half of the data resources, a middle portion including half of the data resources, or a non-consecutive set of resources totally half of the data resources). Subsequently, the UE 515-*a* may transmit, to the UE 515-*b* on the beam 520-*a*, the data transmission over the set of the data resources. Similarly, and in some examples concurrently, the UE 515-*d* may transmit the previously scheduled data transmission to the UE 515-*c* on the beam 520-*d* over a partially or completely overlapping set of the data resources. Because the UE 515-*c* determined that such overlapping data transmissions would not cause interference above a threshold, the UE 515-*b* and the UE 515-*c* may successfully receive the overlapping data transmissions, resulting in efficient use of available data resources and increased system efficiency.

If the UE 515-*c* determines, that a data transmission from the UE 515-*a* to the UE 515-*b* will interfere with the previously scheduled data transmission from the UE 515-*d* on the beam 520-*c* during the first half of the data resources, then the UE 515-*c* may transmit a negative sidelink response (for example, on the beam 520-*c*). The negative sidelink response may indicate that the first half of the data resources are unavailable for a data transmission on beam 520-*a*. In such examples, the sidelink confirmation may indicate a set of data resources that does not conflict with the previously scheduled data transmission. For instance, the sidelink confirmation may indicate a reservation of the second half of the data resources that does not conflict with the first half of the data resources that are unavailable for UE 515-*a*. The UE 515-*d* may transmit the previously scheduled data transmission on beam 520-*d* during the first half of the data resources, and the UE 515-*a* may transmit a data transmission on beam 520-*a* during the second half of the data resources. The UE 515-*b* and the UE 515-*c* may successfully receive their respective data transmissions during the respective portions of the data resources without interfering with each other, resulting in an efficient use of the data resources while decreasing interference and the likelihood of failed transmissions.

In some examples, a target UE 515 and a non-target UE 515 may be previously scheduled to transmit or receive signaling over the data resources. In such examples, a target UE 515 may specify available resources using a positive sidelink response to a requesting UE 515, and a non-target UE 515 may specify unavailable resources using a negative sidelink response to a requesting UE 515. For instance, the UE 515-*c* may be previously scheduled by the UE 515-*d* to receive a data transmission during the second half of the data resources. Similarly, the UE 515-*b* may be previously scheduled to send or receive a data transmission (for example, with another UE 515). In such examples, the UE 515-*a* may transmit a sidelink request indicating a reservation of half of the data resources. The UE 515-*b* may transmit a positive sidelink response indicating that it is available for a data transmission during the first half of the data resources. The UE 515-*a* may determine from the positive sidelink request that the UE 515-*b* is not available for a data transmission during the second half of the data resources. The UE 515-*c* may transmit a negative sidelink response indicating that the second half of the data resources are not available for a data transmission. The UE 515-*a* may determine, from the negative sidelink response, that the second half of the data resources are not available for a data transmission on beam 520-*a*. In such examples, the availability of the UE 515-*b* does not conflict with the transmission schedule for the UE 515-*c* (for example, the UE 515-*b* is available for a data transmission during the first half of the data resources while the UE 515-*c* has indicated that the second half of the data resources are unavailable based on a previously scheduled transmission). In such examples, the UE 515-*a* may transmit a sidelink confirmation reserving the first half of the data resources for a data transmission to the UE 515-*b* on beam 520-*a*.

In some examples, the availability of a target UE 515 may not align with previously scheduled data transmissions for a non-target UE 515. In such examples, the non-target UE may block the requested data transmission. For example, if the UE 515-*b* is available for a data transmission during the first half of the data resources and unavailable for a data transmission during the second half of the data resources, and the UE 515-*c* has been previously scheduled to receive a data transmission over the first half of the data resources, then the UE 515-*c* may transmit a negative sidelink response indicating that the first half of the data resources are unavailable for a data transmission. Upon determining that the availability of the UE 515-*b* overlaps partially or completely with a previously scheduled data transmission for the UE 515-*c* (for example, based on the negative sidelink response), the UE 515-*a* may refrain from transmitting a sidelink confirmation and may refrain from transmitting using the data resources for a given duration (for example, one or more slots).

In some examples, the UEs 515 may reserve or object to transmissions over determined segments of the data resources, as described in greater detail with reference to FIGS. 6 and 7.

Figure 6:
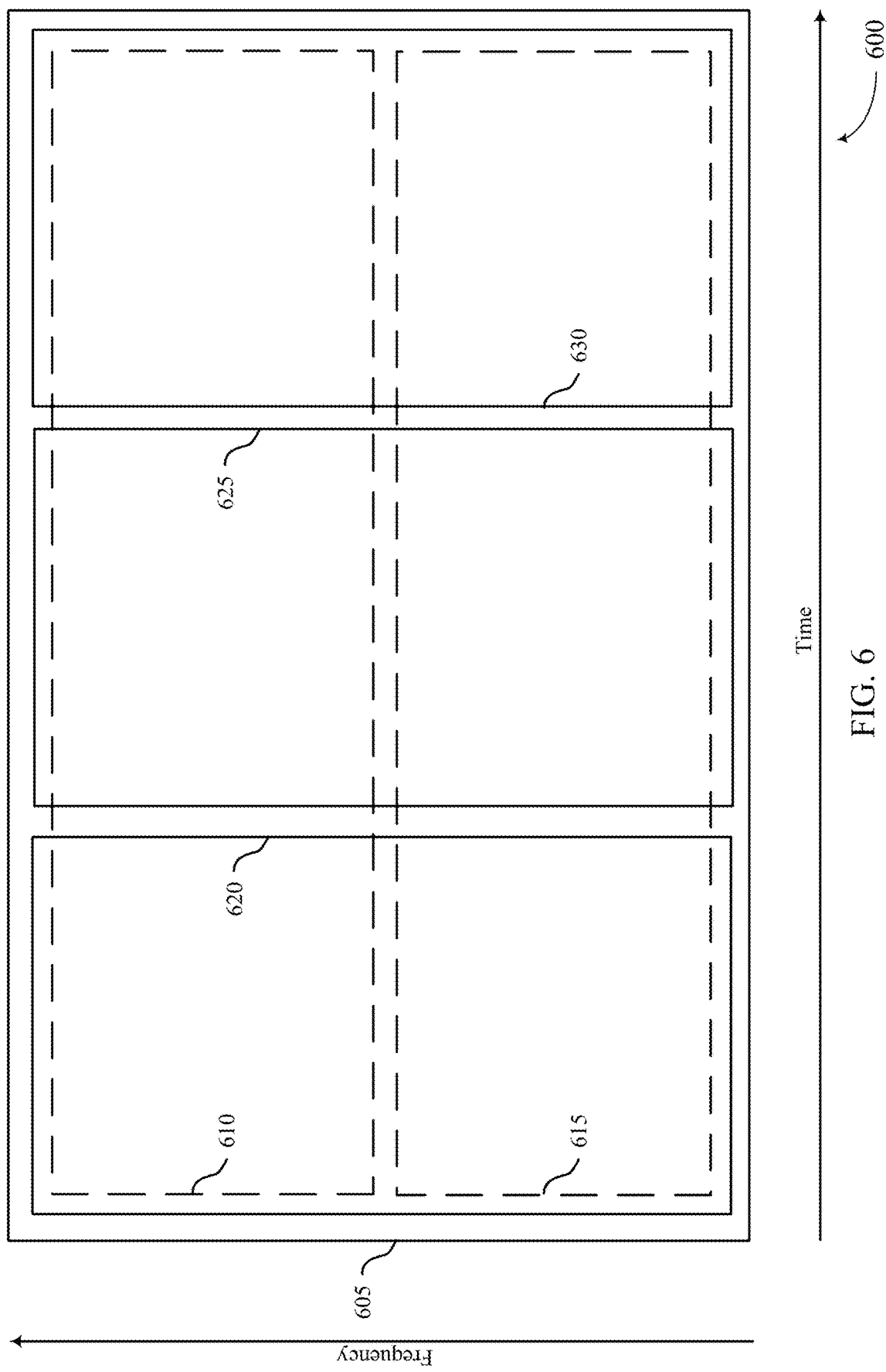
FIG. 6 illustrates an example of a resource pool segmentation that supports sidelink resource pool distribution in accordance with aspects of the present disclosure.

FIG. 6 illustrates an example of a resource pool segmentation 600 that supports sidelink resource pool distribution in accordance with aspects of the present disclosure. In some examples, resource pool segmentation 600 may be implemented by one or more aspects of wireless communications systems 100, 200, 400, or 500.

In some examples, UEs (for example, as described with reference to FIGS. 1-5) may indicate (for example, in sidelink requests, sidelink responses, and sidelink confirmations) determined segments of the data resources. Segments of the data resources may be defined by part or all of the resources in any dimension (for example, time resources, or frequency resources or both as illustrated in FIG. 6; time resources, frequency resources, or spatial resources (or all of the above) as illustrated in FIG. 7). Any combination of sub combination of resources in one or more different dimensions (time, frequency, space) may be used and fall within the scope of the disclosure.

For example, the data resources may be divided into 6 segments of various dimensions. Segment 605, as an example, may span (for example, include) all of the data resources (for example, all of the time resources and all of the frequency resources) as shown in FIG. 6. Segment 610 and segment 615, as examples, may span (for example, include) a portion (for example, half) of the frequency resources and all of the time resources of the data resources as shown in FIG. 6. In some examples, segment 620, segment 625, and segment 630 may span (for example, include) a portion (for example, a third) of the frequency resources and all of the time resources of the data resources. The segmentation shown in FIG. 6 includes some examples, but is not exhaustive and other segmentations are contemplated and fall within the scope of the disclosure. Other segments (for example, not shown) may also be defined, including smaller portions of the time resources, or frequency resources, among other examples.

In some examples, a base station may indicate the segmentation of the data resources to one or more served UEs (such as one or more UEs 515). The segmentation may be communicated via higher layer signaling (for example, radio resource control (RRC) signaling). In some examples, the base station may provide (for example, periodically, semi-periodically) segmentation of available data resources of the pool of shared resources to the UEs. In some examples, the base station may dynamically configure the segmentation of the data resources (for example, via downlink control information (DCI) messages). In some examples, the UEs may negotiate segmentation (for example, using one or more sidelink channels) without additional input from the base station. In some examples, a base station may temporarily, permanently, or dynamically block off one or more segments or portions of segments for other purposes (for example, not sidelink communications or data transmissions). For example, a base station may indicate that segment 630 is reserved (for example, permanently, for a fixed amount of time, or until subsequent updates) for beam monitoring procedures (for example, periodic beam tracking, periodic beam scanning, or beam refining, among other examples). In such examples, all UEs attempting to schedule the data resources may consider the data resources in segment 630 to be unavailable for data transmissions. A base station may similarly indicate unavailable resources (for example, for beam monitoring, among other examples) to a UE in which no determined segments have been configured (for example, as described with reference to FIGS. 4-5).

The UEs may refer to the determined segments if attempting to reserve some or all of the data resources. For example, a first UE may transmit a sidelink request indicating a reservation of segment 620. A second UE may receive the sidelink request, determine that the second UE is the target UE of the sidelink request, and determine the segment 620 as the requested data resources. The second UE may determine that it does not have any scheduled data transmission over the segment 625, and may transmit a positive sidelink response to the first UE. In some examples, a third UE (for example, a non-target UE) may also receive the sidelink request. The third UE may determine that it has no conflicting data transmissions scheduled over the segment 625, and may refrain from transmitting a negative sidelink response. In such examples, the first UE may transmit a sidelink confirmation reserving the segment 625 for a data transmission to the second UE. Or, a fourth UE may have previously scheduled the third UE for a data transmission that partially or completely conflicts with a data transmission from the first UE over the segment 625. For example, the fourth UE may have reserved one or more of the segment 605, the segment 610, the segment 615, or the segment 625 for a data transmission to the third UE. In such examples, the third UE may transmit a negative sidelink response indicating the reserved segment (for example, the segment 605, the segment 610, the segment 615, or the segment 625, among other examples). In such examples, the first UE may refrain from transmitting a sidelink confirmation based at least in part on one or more sidelink responses.

In some examples, the first UE may indicate multiple segments for reservation, any of which would be sufficient for a data transmission. For example, the first UE may transmit a sidelink request indicating one or more of the segment 625 or the segment 630 as potentially for reservation by the first UE. The second UE may determine that it is available for a data transmission in both the segment 625 and the segment 630, and may transmit one or more positive sidelink responses indicating both the segment 625 and the segment 630. The third UE (for example, a non-target UE) may have been previously scheduled by a fourth UE for a data transmission over the segment 625. The third UE may thus transmit a negative sidelink response indicating that the segment 625 is unavailable for a data transmission. In such examples, the first UE may transmit a sidelink confirmation reserving the segment 630 for a data transmission to the second UE. In such examples, the first UE may transmit the data transmission to the second UE over the segment 630, and the third UE may receive a data transmission from the fourth UE over the segment 625, resulting in increased efficiency and decreased interference. If, however, the second UE is also unavailable for a data transmission during the segment 630, it may transmit a positive sidelink response indicating the single segment 625. The third UE may transmit a negative sidelink response indicating the segment 625. In such examples, the first UE may determine that the second UE is only available for a data transmission over the segment 625, but the segment 625 may have been blocked by the third UE, and may refrain from transmitting a sidelink confirmation. If the third UE has been scheduled to receive a data transmission that partially or completely overlaps with any of the multiple segments indicated in the sidelink request, then the third UE may transmit a negative sidelink response indicating all of the conflicting segments.

For example, the fourth UE may have previously scheduled the third UE to receive a data transmission over the segment 610. The sidelink request from the first UE may indicate either the segment 625 or the segment 630. But a data transmission over either of the segment 625 or the segment 630 may conflict with the previously scheduled data transmission over the segment 610. In such examples, the third UE may transmit a negative sidelink response indicating both the segment 625 and the segment 630. In such examples, the first UE may refrain from transmitting a sidelink confirmation.

In some examples, a sidelink request, a sidelink response, or a sidelink confirmation, among other examples, may include an indication of a segment in the payload of the message. That is, one or more bits in the sidelink request, sidelink response, or sidelink confirmation, may indicate one or more segments.

In some examples, a sidelink request, a sidelink response, or a sidelink confirmation, among other examples, may implicitly indicate one or more segments. For example, a waveform of the message, one or more control resources on which the UE transmits the message, or tones on which the UE transmits the message, among other examples, may implicitly indicate a segment. A base station may configure a pool of resources, tones, or waveforms, among other examples, each resource, tone, or waveform corresponding to a determined segment. In some examples, the pool of resources, tones, or waveforms, among other examples, may be determined or indicated in a standard such that each UE is aware of the resources, tones, waveforms, or combinations thereof. In some illustrative examples, a base station may configure the UEs with multiple control resources for each portion of a slot of a control block. For instance, the resources in the first portion of the slot for transmitting sidelink requests may include 6 resources on which a UE may transmit a sidelink request. The second portion of the slot for transmitting sidelink request may include 6 resources for transmitting positive sidelink requests and 6 resources for transmitting negative sidelink requests. The third portion of the slide may include 6 resources for transmitting sidelink confirmations. To request reservation of a second of the six available segments (for example, segment 610), the first UE may transmit a sidelink request on the second resource in the first portion of the slot that corresponds to segment 610. To transmit a positive sidelink message for segment 610, the second UE may transmit a positive sidelink response on the second resource in the second portion of the slot that corresponds to the segment 610. To transmit a negative sidelink message for segment 610, the third UE may transmit a negative sidelink response on the second resource in the second portion of the slot that corresponds to the segment 610. Or, the third UE may transmit a negative sidelink request for another segment (for example, segment 620) that may partially overlap with segment 610 by selecting another resource of the six available resources that corresponds to segment 620. The first UE may, if segment 620 is available, transmit a sidelink confirmation indicating segment 620 by selecting the resource that corresponds to segment 620 during the third portion of the slot. The UEs may similarly implicitly indicate specific segments of the data resources by using determined waveforms or tones to transmit the various messages in each control block with respect to resources.

UEs may apply a similar method of implicit indications of data resources even without base station coordination (for example. In some examples, no defined segmentation is defined, as described with reference to FIGS. 4-5). That is, a preconfigured or standardized set of waveforms, resources, or tones, among other examples, may correspond to portions of or fractions of data resources. For example, a first tone may indicate a first portion (for example, a third) of the available data resources, a second tone may indicate a second portion (for example, a middle third) of the available data resources, a third tone may indicate a second portion (for example, a final third) of the available data resources a fourth tone may indicate all of the available data resources, and so on. In some examples, combinations of waveforms, resources, and tones, among other examples, may be configured to indicate more discrete portions or combinations of available portions of the data resources.

Figure 7:
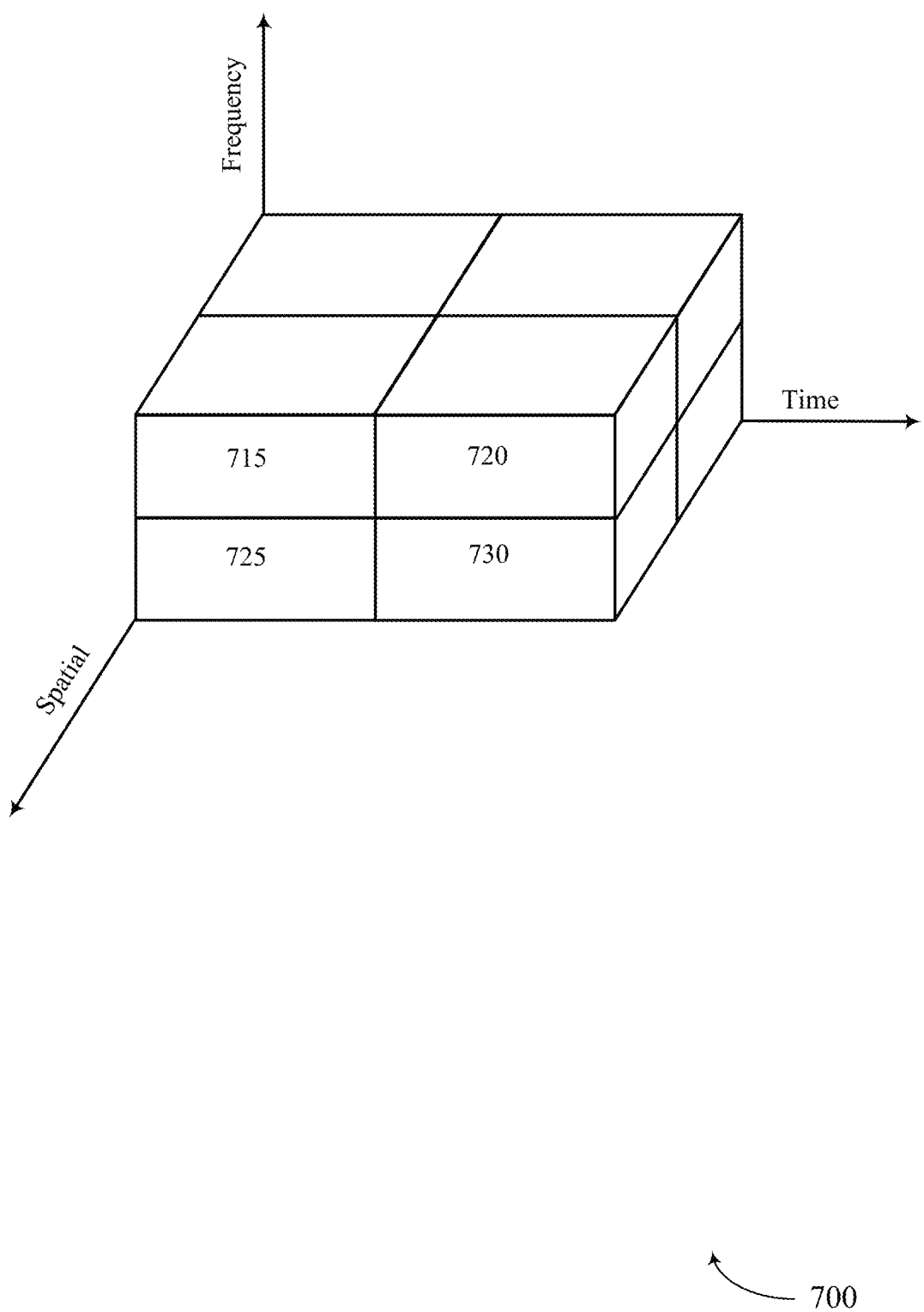
FIG. 7 illustrates an example of a resource pool segmentation that supports sidelink resource pool distribution in accordance with aspects of the present disclosure.

FIG. 7 illustrates an example of a resource pool segmentation 700 that supports sidelink resource pool distribution in accordance with aspects of the present disclosure. In some examples, resource pool segmentation 700 may implement aspects of wireless communications systems 100, 200, 400, 500, and 600.

In some examples, UEs may attempt to claim data resource segments defined by time resources, frequency resources, or spatial resources, or any combination thereof. Each segment may be defined by time resources, frequency resources, and spatial resources (for example, using different polarizations). For example, some signals may be H-polarized, or polarized in the horizontal plane (for example, at 0 degrees), while other signals may be V-polarized, or polarized in the vertical plane (for example, at 90 degrees). In some instances, different signals can be polarized according to different angles (30 degree polarization, 45 degree polarization, 70 degree polarization, among other examples). Segment 715 may be defined by frequency resources, time resources, and a particular polarization (for example, 0 degree polarization, 30 degree polarization, 45 degree polarization, 70 degree polarization, 90 degree polarization, among other examples).

The UEs may transmit sidelink requests, sidelink responses, and sidelink confirmations, among other examples, indicating different segments. A base station or at least one of the UEs may configure the segments, and the UEs may be indicate specific segments explicitly or implicitly. For example, a first UE may transmit a sidelink request indicating segment 715 or segment 725. A second UE (for example, a target UE of the sidelink request) may transmit a positive sidelink response indicating either of segment 715 or segment 725. A third UE (for example, a non-target UE) may be scheduled to communicate with another UE using segment 715 and segment 720 and segment 730. In such examples, the third UE may transmit a negative sidelink response indicating segment 715, segment 720, and segment 730. The first UE may determine that segment 725 is available for a data transmission to the second UE, and may transmit a sidelink confirmation indicating segment 725.

As illustrated and described with respect to FIGS. 2-7, a target UE may transmit a positive sidelink response to indicate its availability and refrain from transmitting a positive sidelink response to indicate its unavailability. Similarly, a non-target UE may transmit a negative sidelink response to indicate an objection to a data transmission, or may refrain from transmitting a negative sidelink response to indicate a tolerance of a data transmission. That is, a non-target UE 825 may refrain from transmitting a negative sidelink response if it has no objection (for example, a previously scheduled data transmission or an interference level, among other examples) to a data transmission from a first UE that transmitted the sidelink request.

Additionally, or alternatively, in some examples, such a signaling scheme could be altered to achieve the same affect. That is, each of the techniques and methods described with respect to FIGS. 2-7 could also be implemented in similar fashion in which a target UE may refrain from transmitting a negative sidelink response to indicate its availability (for example, instead of refraining from transmitting a positive sidelink response) and transmit a negative sidelink response to indicate its unavailability (for example, instead of transmitting a positive sidelink response), and a non-target UE 825 may transmit a positive sidelink response to indicate an acceptance or tolerance of a data transmission (for example, instead of refraining from transmitting a negative sidelink repose) and refrain from transmitting a positive sidelink repose to indicate an objection to a data transmission (for example, instead of transmitting a negative sidelink response).

Additionally, or alternatively, in some examples, each of the UEs may be configured to respond actively to every received sidelink request. For instance, a first UE may transmit a sidelink request to a target UE. If the target UE is available for a data transmission from the first UE then the target UE may transmit a positive sidelink response to the first UE indicating any available segments or sets of data resources, or a negative sidelink response indicating any unavailable segments or sets of data resources, or both. A non-target UE may similarly transmit a positive sidelink response to the first UE indicating any available segments or sets of data resources, or a negative sidelink response indicating any unavailable segments or sets of data resources, or both. In some examples, the first UE could then determine the availability of the requested data resources based on positive and negative sidelink responses.

Figure 8:
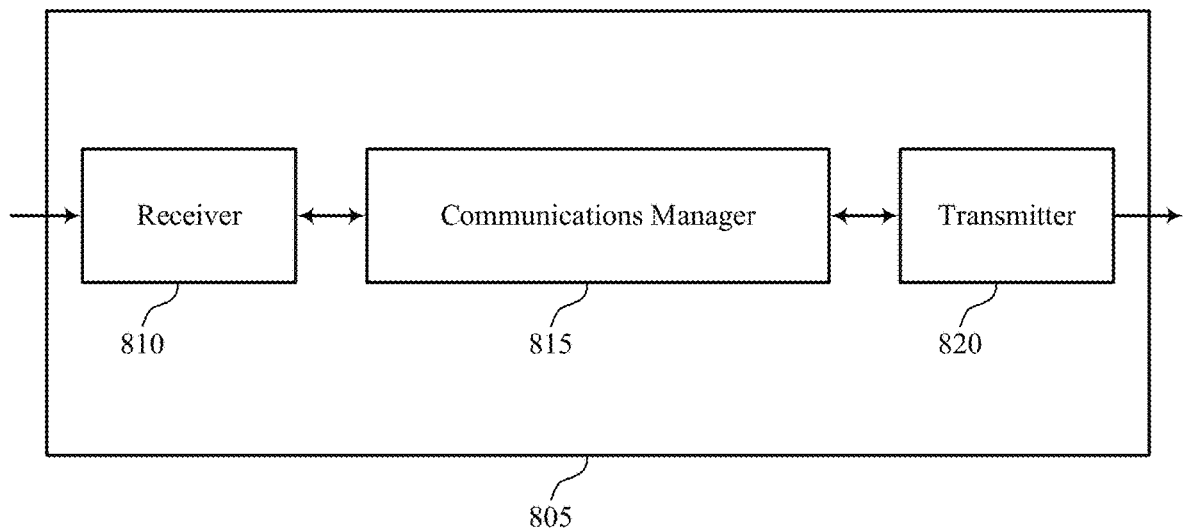
FIGS. 8 and 9 show block diagrams of devices that support sidelink resource pool distribution in accordance with aspects of the present disclosure.

FIG. 8 shows a block diagram of a device 805 that supports sidelink resource pool distribution in accordance with aspects of the present disclosure. The device 805 may be an example of aspects of a UE 115 as described herein. For example, device 805 may be a transmitting UE in communication with a target UE and a non-target UE, a target UE in communication with a transmitting UE and a non-target UE, or a non-target UE in communication with a transmitting UE and a target UE. In some examples, the transmitting UE may be referred to as a first UE, and the non-target UE may be referred to as a second UE or a third UE. In some examples, the non-target UE may be referred to as a first UE and the transmitting UE may be referred to as a second UE or a third UE. The device 805 may include a receiver 810, a communications manager 815, and a transmitter 820. The communications manager 815 may be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to sidelink resource pool distribution, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine shared resources for communicating over one or more sidelink communication links, the shared resources including control resources and data resources, the control resources and the data resources in a set of slots, transmit, to a second UE on a transmission beam over the control resources in a first portion of a slot of the set of slots, a sidelink request indicating a first set of the data resources for reservation, monitor, by the first UE on a receive beam over the control resources in a second portion of the slot, for one or more sidelink responses from one or more UEs, the one or more sidelink responses including one or more positive sidelink responses indicating a first group of the data resources as available for reservation, or one or more negative sidelink responses indicating a second group of the data resources as unavailable for reservation, or both, and determine, based on the monitoring, whether to transmit a sidelink confirmation indicating a reservation of at least a portion of the first set of the data resources to the second UE over the control resources in a third portion of the slot. The communications manager 815 may also determine shared resources for communicating over one or more sidelink communication links, the shared resources including control resources and data resources, the control resources and the data resources in a set of slots, monitor, on a receive beam over the control resources in a first portion of a slot of the set of slots, for a sidelink request from a first UE indicating a first set of the data resources for reservation, receive, in the first portion of the slot based on the monitoring, the sidelink request from the first UE, the sidelink request indicating that the second UE is a target UE of the sidelink request, and determine, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both. The communications manager 815 may also determine shared resources for communicating over one or more sidelink communication links, the shared resources including control resources and data resources, the control resources and the data resources in a set of slots, monitor, on a receive beam over the control resources in a first portion of a slot of the set of slots, for a sidelink request from a first UE indicating a first set of the data resources for reservation, receive, in the first portion of the slot based on the monitoring, the sidelink request from the first UE, the sidelink request indicating that a second UE is a target UE of the sidelink request, and determine, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both. The communications manager 815 may be an example of aspects of the communications manager 1110 described herein.

The communications manager 815, or its sub-components, may be physically located at different locations, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
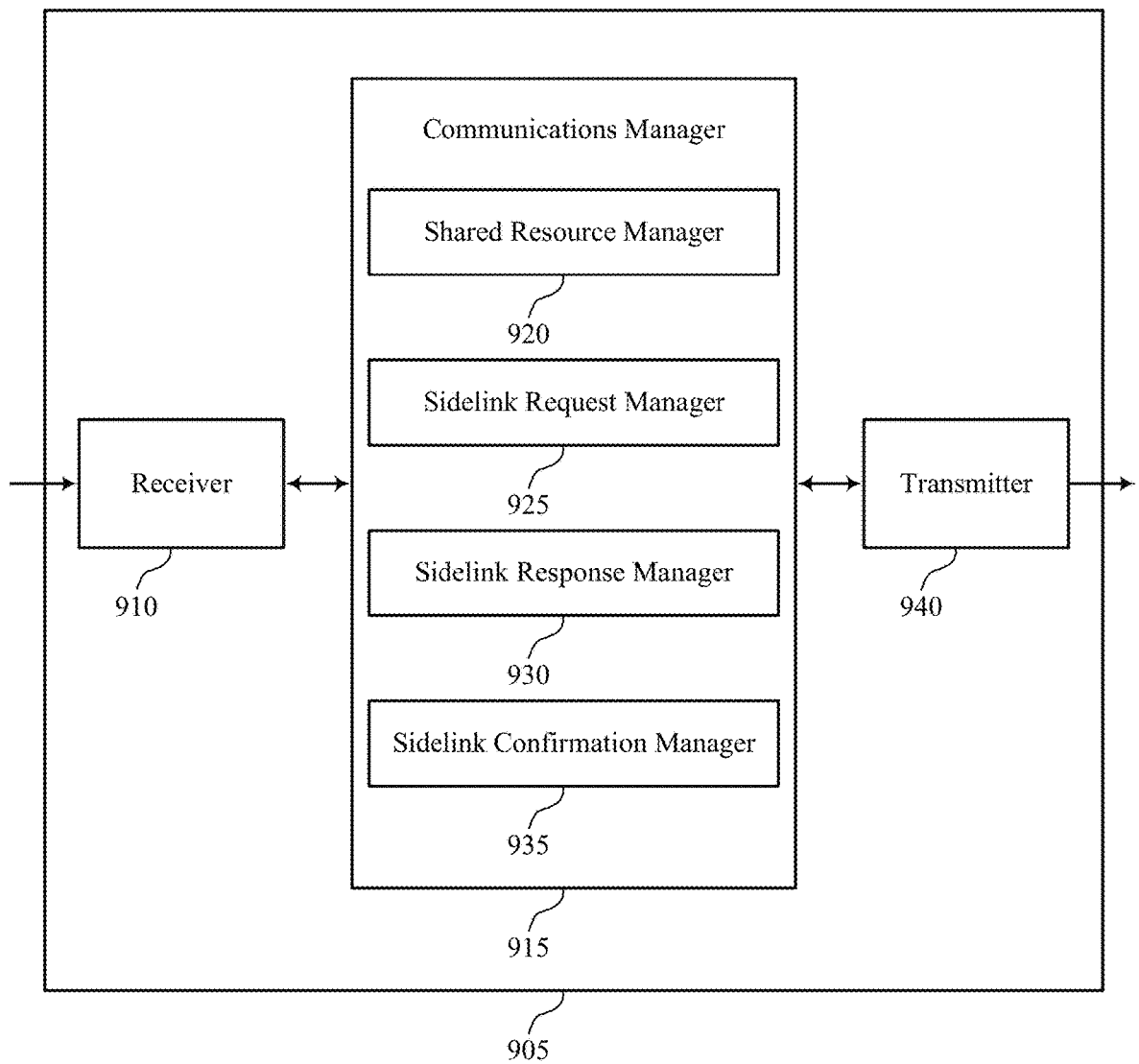

FIG. 9 shows a block diagram of a device 905 that supports sidelink resource pool distribution in accordance with aspects of the present disclosure. The device 905 may be an example of aspects of a device 805, or a UE 115. For example, the device 905 may be a transmitting UE in communication with a target UE and a non-target UE, a target UE in communication with a transmitting UE and a non-target UE, or a non-target UE in communication with a transmitting UE and a target UE. In some examples, the transmitting UE may be referred to as a first UE, and the non-target UE may be referred to as a second UE or a third UE. In some examples, the non-target UE may be referred to as a first UE and the transmitting UE may be referred to as a second UE or a third UE. The device 905 may include a receiver 910, a communications manager 915, and a transmitter 940. The communications manager 915 may be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to sidelink resource pool distribution, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815. The communications manager 915 may include a shared resource manager 920, a sidelink request manager 925, a sidelink response manager 930, and a sidelink confirmation manager 935. The communications manager 915 may be an example of aspects of the communications manager 1110 described herein.

The shared resource manager 920 may determine shared resources for communicating over one or more sidelink communication links, the shared resources including control resources and data resources, the control resources and the data resources in a set of slots.

The sidelink request manager 925 may transmit, to a second UE on a transmission beam over the control resources in a first portion of a slot of the set of slots, a sidelink request indicating a first set of the data resources for reservation.

The sidelink response manager 930 may monitor, by the first UE on a receive beam over the control resources in a second portion of the slot, for one or more sidelink responses from one or more UEs, the one or more sidelink responses including one or more positive sidelink responses indicating a first group of the data resources as available for reservation, or one or more negative sidelink responses indicating a second group of the data resources as unavailable for reservation, or both.

The sidelink confirmation manager 935 may determine, based on the monitoring, whether to transmit a sidelink confirmation indicating a reservation of at least a portion of the first set of the data resources to the second UE over the control resources in a third portion of the slot.

The shared resource manager 920 may determine shared resources for communicating over one or more sidelink communication links, the shared resources including control resources and data resources, the control resources and the data resources in a set of slots.

The sidelink request manager 925 may monitor, on a receive beam over the control resources in a first portion of a slot of the set of slots, for a sidelink request from a first UE indicating a first set of the data resources for reservation and receive, in the first portion of the slot based on the monitoring, the sidelink request from the first UE, the sidelink request indicating that the second UE is a target UE of the sidelink request.

The sidelink response manager 930 may determine, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both.

The shared resource manager 920 may determine shared resources for communicating over one or more sidelink communication links, the shared resources including control resources and data resources, the control resources and the data resources in a set of slots.

The sidelink request manager 925 may monitor, on a receive beam over the control resources in a first portion of a slot of the set of slots, for a sidelink request from a first UE indicating a first set of the data resources for reservation.

The sidelink response manager 930 may receive, in the first portion of the slot based on the monitoring, the sidelink request from the first UE, the sidelink request indicating that a second UE is a target UE of the sidelink request and determine, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both.

The transmitter 940 may transmit signals generated by other components of the device 905. In some examples, the transmitter 940 may be collocated with a receiver 910 in a transceiver component. For example, the transmitter 940 may be an example of aspects of the transceiver 1120 described with reference to FIG. 11. The transmitter 940 may utilize a single antenna or a set of antennas.

Figure 10:
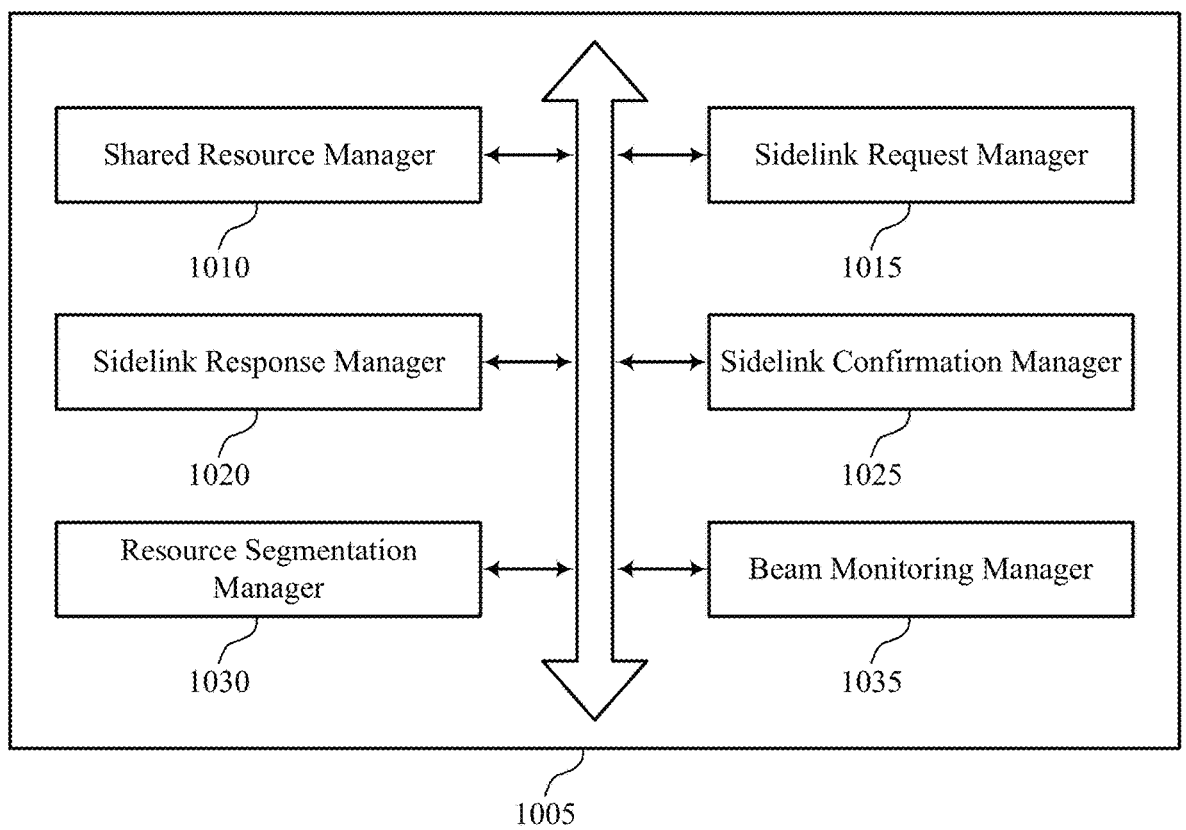
FIG. 10 shows a block diagram of a communications manager that supports sidelink resource pool distribution in accordance with aspects of the present disclosure.

FIG. 10 shows a block diagram of a communications manager 1005 that supports sidelink resource pool distribution in accordance with aspects of the present disclosure. The communications manager 1005 may be an example of aspects of a communications manager 815, a communications manager 915, or a communications manager 1110 of a device, such as a UE 115 described herein. For example, the device may be a transmitting UE in communication with a target UE and a non-target UE, a target UE in communication with a transmitting UE and a non-target UE, or a non-target UE in communication with a transmitting UE and a target UE. In some examples, the transmitting UE may be referred to as a first UE, and the non-target UE may be referred to as a second UE or a third UE. In some examples, the non-target UE may be referred to as a first UE and the transmitting UE may be referred to as a second UE or a third UE. The communications manager 1005 may include a shared resource manager 1010, a sidelink request manager 1015, a sidelink response manager 1020, a sidelink confirmation manager 1025, a resource segmentation manager 1030, and a beam monitoring manager 1035. Each of these components may communicate, directly or indirectly, with one another (for example, via one or more buses).

The shared resource manager 1010 may determine shared resources for communicating over one or more sidelink communication links, the shared resources including control resources and data resources, the control resources and the data resources in a set of slots. In some examples, the shared resource manager 1010 may determine shared resources for communicating over one or more sidelink communication links, the shared resources including control resources and data resources, the control resources and the data resources in a set of slots. In some examples, the shared resource manager 1010 may determine shared resources for communicating over one or more sidelink communication links, the shared resources including control resources and data resources, the control resources and the data resources in a set of slots. In some examples, the shared resource manager 1010 may select, from the first group of the data resources based on determining whether to transmit the sidelink confirmation, the first set of the data resources.

In some examples, the shared resource manager 1010 may determine a set of tones, a set of waveforms, a set of the control resources in the first portion of the slot, or any combination thereof. In some examples, the shared resource manager 1010 may select a tone from the set of tones, a waveform from the set of waveforms, a control resource from the set of the control resources, or any combination thereof. In some examples, the selected tone, waveform, control resource, or combination thereof corresponds to the first set of the data resources, and where transmitting the sidelink request indicating the first set of the data resources for reservation is based on the selected tone, waveform, control resource, or combination thereof. In some examples, the shared resource manager 1010 may determine that the first group of the data resources including at least a portion of the first set of the data resources is unavailable for reservation. In some examples, determining whether to transmit the sidelink response is based on determining that the first group of the data resources is unavailable for reservation.

In some examples, the shared resource manager 1010 may determine that the first group of the data resources, or the second group of the data resources, or both, are unavailable for reservation. In some examples, determining whether to transmit the sidelink response is based on determining that the first group of the data resources, or the second group of the data resources, or both, are unavailable for reservation. In some examples, the shared resource manager 1010 may determine at least a portion of a third group of the data resources of the set of groups of the data resources that is reserved for beam monitoring. In some examples, determining whether to transmit the sidelink response is based on determining the third group of the data resources. In some examples, the shared resource manager 1010 may determine a set of tones, a set of waveforms, a set of the control resources in the first portion of the slot, or any combination thereof. In some examples, each tone, waveform, control resource, or combination thereof corresponds to a different set of the data resources. In some examples, the shared resource manager 1010 may determine, upon receiving the sidelink request indicating the first set of the data resources for reservation, a first tone of the set of tones, a first waveform of the set of waveforms, a first control resource of the set of the control resources, or a first combination thereof, that indicates the first set of the data resources, wherein determining whether to transmit the sidelink response in the second portion of the slot is based at least in part on determining the first tone of the set of tones, the first waveform of the set of waveforms, the first control resource of the set of the control resources, or the first combination thereof.

In some examples, the shared resource manager 1010 may determine that the second group of the data resources is available for reservation. In some examples, the shared resource manager 1010 may determine that the second group of the data resources is unavailable for reservation. In some examples, the shared resource manager 1010 may determine that the second group of the data resources is available for transmitting. In some examples, the shared resource manager 1010 may determine at least a portion of a third group of the data resources of the set of groups of the data resources that is reserved for beam monitoring. In some examples, determining whether to transmit the sidelink response is based on determining the third group of the data resources. In some examples, the shared resource manager 1010 may determine a set of tones, a set of waveforms, a set of the control resources in the first portion of the slot, or any combination thereof. In some examples, each tone, waveform, control resource, or combination thereof corresponds to a different set of the data resources.

In some examples, the shared resource manager 1010 may determine, upon receiving the sidelink request indicating the first set of the data resources for reservation, a first tone of the set of tones, a first waveform of the set of waveforms, a first control resource of the set of the control resources, or a first combination thereof, that indicates the first set of the data resources. In some examples, determining whether to transmit the sidelink response in the second portion of the slot is based on determining the first tone of the set of tones, the first waveform of the set of waveforms, the first control resource of the set of the control resources, or the first combination thereof. In some examples, the first set of the data resources includes less than all of the data resources. In some examples, the first group of the data resources includes less than all of the first set of the data resources, or the second group of the data resources includes less than all of the first set of the data resources, or the second group of the data resources does not overlap with the first set of the data resources, or any combination thereof.

The sidelink request manager 1015 may transmit, to a second UE on a transmission beam over the control resources in a first portion of a slot of the set of slots, a sidelink request indicating a first set of the data resources for reservation. In some examples, the sidelink request manager 1015 may monitor, on a receive beam over the control resources in a first portion of a slot of the set of slots, for a sidelink request from a first UE indicating a first set of the data resources for reservation. In some examples, the sidelink request manager 1015 may receive, in the first portion of the slot based on the monitoring, the sidelink request from the first UE, the sidelink request indicating that the second UE is a target UE of the sidelink request. In some examples, the sidelink request manager 1015 may monitor, on a receive beam over the control resources in a first portion of a slot of the set of slots, for a sidelink request from a first UE indicating a first set of the data resources for reservation.

The sidelink response manager 1020 may monitor, by the first UE on a receive beam over the control resources in a second portion of the slot, for one or more sidelink responses from one or more UEs, the one or more sidelink responses including one or more positive sidelink responses indicating a first group of the data resources as available for reservation, or one or more negative sidelink responses indicating a second group of the data resources as unavailable for reservation, or both. In some examples, the sidelink response manager 1020 may determine, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both. In some examples, the sidelink response manager 1020 may receive, in the first portion of the slot based on the monitoring, the sidelink request from the first UE, the sidelink request indicating that a second UE is a target UE of the sidelink request. In some examples, the sidelink response manager 1020 may determine, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both.

In some examples, the sidelink response manager 1020 may receive, during the second portion of the slot based on the monitoring, a positive sidelink response from the second UE indicating the first group of the data resources as available for reservation, and not receiving any negative sidelink responses indicating the second group of the data resources as unavailable for reservation. In some examples, determining whether to transmit the sidelink confirmation is based on receiving the positive sidelink response and not receiving any negative sidelink responses. In some examples, the sidelink response manager 1020 may receive, in the second portion of the slot based on the monitoring, a positive sidelink response from the second UE indicating the first group of the data resources as available for reservation and a negative sidelink response from a third UE indicating the second group of the data resources as unavailable for reservation. In some examples, the first group of the data resources does not overlap with the second group of the data resources, and where determining whether to transmit the sidelink confirmation is based on receiving the positive sidelink response and the negative sidelink response. In some examples, the sidelink response manager 1020 may receive, in the second portion of the slot based on the monitoring, a positive sidelink response from the second UE indicating the first group of the data resources as available for reservation, and a negative sidelink response from a third UE indicating the second group of the data resources as unavailable for reservation. In some examples, the first group of the data resources at least partially overlaps with the second group of the data resources, and where determining whether to transmit the sidelink confirmation is based on receiving the positive sidelink response and the negative sidelink response.

In some examples, the sidelink response manager 1020 may not receiving, in the second portion of the slot based on the monitoring, a positive sidelink response from the second UE indicating the first group of the data resources as available for reservation. In some examples, the first group of the data resources at least partially overlaps with the first set of the data resources, and where determining whether to transmit the sidelink confirmation is based on not receiving the positive sidelink response from the second UE. In some examples, the sidelink response manager 1020 may receive, in the second portion of the slot based on the monitoring, a positive sidelink response from the second UE indicating the first group of the data resources and the second group of the data resources as available for reservation, and a negative sidelink response from a third UE indicating the second group of the data resources as unavailable for reservation. In some examples, the first group of the data resources does not overlap with the second group of the data resources, and where determining whether to transmit the sidelink confirmation is based on receiving the positive sidelink response and the negative sidelink response. In some examples, the sidelink response manager 1020 may receive, in the second portion of the slot based on the monitoring, a positive sidelink response from the second UE indicating the first group of the data resources as available for reservation, and a negative sidelink response from a third UE indicating the second group of the data resources as unavailable for reservation. In some examples, the first group of the data resources and the second group of the data resources at least partially overlap, and where determining whether to transmit the sidelink confirmation is based on receiving the positive sidelink response and the negative sidelink response.

In some examples, the sidelink response manager 1020 may receive, in the second portion of the slot based on the monitoring, a positive sidelink response from the second UE indicating the first group of the data resources as available for reservation, and a negative sidelink response from a third UE indicating the second group of the data resources as unavailable for reservation. In some examples, the first group of the data resources does not overlap with the second group of the data resources, and where determining whether to transmit the sidelink confirmation is based on receiving the positive sidelink response and the negative sidelink response. In some examples, the sidelink response manager 1020 may receive, in the second portion of the slot based on the monitoring, a positive sidelink response from the second UE indicating the first group of the data resources as available, and not receiving any negative sidelink responses indicating the second group of the data resources as unavailable for reservation. In some examples, determining whether to transmit the sidelink confirmation is based on receiving the positive sidelink response and not receiving any negative sidelink responses. In some examples, the sidelink response manager 1020 may not receiving, in the second portion of the slot based on the monitoring, a positive sidelink response from the second UE indicating the first group of the data resources as available for reservation. In some examples, determining whether to transmit the sidelink confirmation is based on not receiving the positive sidelink response from the second UE.

In some examples, the sidelink response manager 1020 may transmit, to the first UE in the second portion of the slot based on determining whether to transmit the sidelink response, a positive sidelink response indicating the first group of the data resources as available for reservation. In some examples, the sidelink response manager 1020 may refrain, in a third portion of the slot based on determining whether to transmit the sidelink response, from transmitting the positive sidelink response. In some examples, the sidelink response manager 1020 may transmit, to the first UE in the second portion of the slot based on receiving the sidelink request, a positive sidelink response indicating the first group of the data resources and the second group of the data resources as available for reservation. In some examples, the sidelink response manager 1020 may refrain from transmitting, in the second portion of the slot based on determining that the second group of the data resources is available for reservation, the negative sidelink response.

In some examples, the sidelink response manager 1020 may transmit, in the second portion of the slot based on determining that the second group of the data resources is unavailable for reservation, the negative sidelink response. In some examples, the sidelink response manager 1020 may transmit, to the first UE in the second portion of the slot based on receiving the sidelink request, the negative sidelink response indicating the second group of the data resources as unavailable for reservation.

The sidelink confirmation manager 1025 may determine, based on the monitoring, whether to transmit a sidelink confirmation indicating a reservation of at least a portion of the first set of the data resources to the second UE over the control resources in a third portion of the slot. In some examples, the sidelink confirmation manager 1025 may transmit, based on selecting the first set of the data resources, the sidelink confirmation in the third portion of the slot indicating the reservation of the first set of the data resources. In some examples, the sidelink confirmation manager 1025 may refrain from transmitting, based on determining whether to transmit the sidelink confirmation, the sidelink confirmation in the third portion of the slot indicating the reservation of the first set of the data resources.

In some examples, the sidelink confirmation manager 1025 may refrain from transmitting, based on determining whether to transmit the sidelink confirmation, the sidelink confirmation in the third portion of the slot indicating the reservation of the first set of the data resources. In some examples, the sidelink confirmation manager 1025 may transmit, based on selecting the first set of the data resources, the sidelink confirmation in the third portion of the slot indicating the reservation of the first set of the data resources. In some examples, the sidelink confirmation manager 1025 may monitor the control resources in a third portion of the slot, based on transmitting the positive sidelink response, for a sidelink confirmation indicating a reservation of at least a portion of the first set of the data resources. In some examples, the sidelink confirmation manager 1025 may receive, in the third portion of the slot based on the monitoring, the sidelink confirmation indicating at least the portion of the first set of the data resources including at least a portion of the first group of the data resources, or the second group of the data resources, or both.

In some examples, the sidelink confirmation manager 1025 may determine, based on the monitoring, that the first UE has not transmitted the sidelink confirmation. In some examples, the sidelink confirmation manager 1025 may monitor the control resources in a third portion of the slot based on transmitting the positive sidelink response, for a sidelink confirmation indicating a reservation of at least a portion of the first set of the data resources. In some examples, the sidelink confirmation manager 1025 may receive, in the third portion of the slot based on the monitoring, the sidelink confirmation indicating a reservation of at least the portion of the first set of the data resources including the first group of the data resources, or the second group of the data resources, or both.

In some examples, the sidelink confirmation manager 1025 may refrain, in a third portion of the slot based on determining whether to transmit the sidelink response, from transmitting the sidelink response. In some examples, the sidelink confirmation manager 1025 may monitor, in a third portion of the slot based on refraining from transmitting the negative sidelink response, for a sidelink confirmation. In some examples, the sidelink confirmation manager 1025 may receive, in the third portion of the slot based on the monitoring, the sidelink confirmation indicating a reservation of at least the portion of the first set of the data resources including the first group of the data resources, or the second group of the data resources, or both. In some examples, the sidelink confirmation manager 1025 may receive, in a third portion of the slot based on transmitting the negative sidelink response, a sidelink confirmation indicating a reservation of at least a portion of the first set of the data resources including the first group of the data resources.

In some examples, the sidelink confirmation manager 1025 may determine, based on monitoring for a sidelink confirmation, that the first UE has not transmitted the sidelink confirmation indicating a reservation of at least a portion of the first set of the data resources. In some examples, the sidelink confirmation manager 1025 may monitor, in a third portion of the slot based on transmitting the negative sidelink response, for a sidelink confirmation from the first UE. In some examples, the sidelink confirmation manager 1025 may receive, in the third portion of the slot based on the monitoring, the sidelink confirmation indicating a reservation of at least a portion of the first set of the data resources including the first group of the data resources. In some examples, the first group of the data resources does not overlap with the second group of the data resources. In some examples, the sidelink confirmation manager 1025 may determine, based on monitoring for the sidelink confirmation, that the first UE has not transmitted the sidelink confirmation indicating a reservation of at least a portion of the first set of the data resources including the first group of the data resources. In some examples, the first group of the data resources and the second group of the data resources at least partially overlap. In some examples, the sidelink confirmation manager 1025 may refrain from transmitting, in a third portion of the slot based on determining that the second group of the data resources is available for transmitting, the negative sidelink response.

The resource segmentation manager 1030 may determine a set of groups of the data resources, the set of groups including the first group of the data resources and the second group of the data resources, the first set of the data resources including one or more groups of the set of groups of the data resources. In some examples, transmitting the sidelink request indicating the first set of the data resources for reservation is based on determining the set of groups of the data resources. In some examples, the resource segmentation manager 1030 may select, from the set of groups of the data resources, the first group of the data resources and the second group of the data resources. In some examples, the sidelink request indicates that the first set of the data resources for reservation include one or more of the first group of the data resources or the second group of the data resources. In some examples, the resource segmentation manager 1030 may receive, from a base station, an indication of the set of groups of the data resources. In some examples, determining the set of groups of the data resources is based on receiving the indication of the set of groups of the data resources. In some examples, resource segmentation manager 1030 may determine a set of groups of the data resources, the set of groups including the first group of the data resources and the second group of the data resources, the first set of the data resources including one or more groups of the set of groups of the data resources. In some examples, the sidelink request indicates that the first set of the data resources for reservation includes one or more of the first group of the data resources or the second group of the data resources.

In some examples, the resource segmentation manager 1030 may receive, from a base station, an indication of the set of groups of the data resources. In some examples, determining the set of groups of the data resources is based on receiving the indication of the set of groups of the data resources. In some examples, resource segmentation manager 1030 may determine a set of groups of the data resources, the set of groups including the first group of the data resources and the second group of the data resources, the first set of the data resources including one or more groups of the set of groups of the data resources. In some examples, the sidelink request indicates that the first set of the data resources for reservation includes one or more of the first group of the data resources or the second group of the data resources.

In some examples, the resource segmentation manager 1030 may receive, from a base station, an indication of the set of groups of the data resources. In some examples, determining the set of groups of the data resources is based on receiving the indication of the set of groups of the data resources. In some examples, the set of groups of the data resources is preconfigured at the first UE. In some examples, each group of the data resources includes one or more of a set of frequency resources of the data resources, a set of time resources of the data resources, or a set of spatial resources of the data resources. In some examples, a group of the data resources spans one or more of all frequency resources of the data resources, all time resources of the data resources, or all spatial resources of the data resources. In some examples, the set of groups of the data resources is preconfigured at the second UE. In some examples, each group of the data resources includes one or more of a set of frequency resources of the data resources, a set of time resources of the data resources, or a set of spatial resources of the data resources. In some examples, a group of the data resources spans one or more of all frequency resources of the data resources, all time resources of the data resources, or all spatial resources of the data resources. In some examples, the set of groups of the data resources is preconfigured at the third UE. In some examples, each group of the data resources includes one or more of a set of frequency resources of the data resources, a set of time resources of the data resources, or a set of spatial resources of the data resources. In some examples, a group of the data resources spans one or more of all frequency resources of the data resources, all time resources of the data resources, or all spatial resources of the data resources.

The beam monitoring manager 1035 may determine at least a portion of a third group of the data resources of the set of groups of the data resources as reserved for a beam monitoring procedure. In some examples, selecting the first group of the data resources and the second group of the data resources is based on determining at least the portion of the third group. In some examples, the beam monitoring manager 1035 may determine a second set of the data resources as reserved for a beam monitoring procedure. In some examples, the beam monitoring manager 1035 may select, from the data resources based on determining the second set of the data resources, the first set of the data resources. In some examples, transmitting the sidelink request indicating the first set of the data resources for reservation is based on the selecting.

In some examples, the beam monitoring manager 1035 may determine a second set of the data resources as reserved for a beam monitoring procedure. In some examples, determining whether to transmit the sidelink response is based on determining the second set of the data resources. In some examples, the beam monitoring manager 1035 may determine a second set of the data resources as reserved for a beam monitoring procedure, in some examples, determining whether to transmit the sidelink response is based on determining the second set of the data resources.

Figure 11:
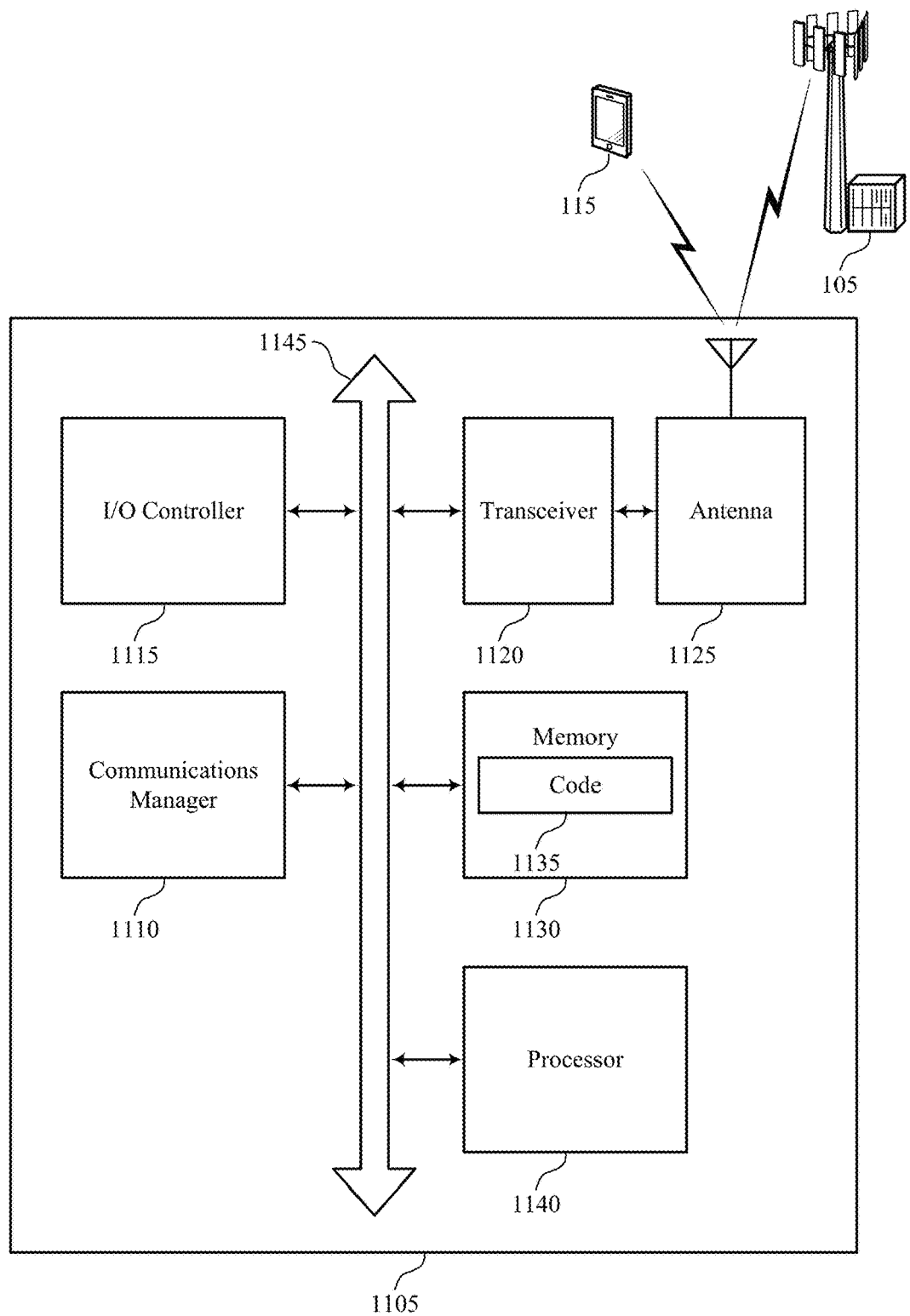
FIG. 11 shows a diagram of a system including a device that supports sidelink resource pool distribution in accordance with aspects of the present disclosure.

FIG. 11 shows a diagram of a system including a device 1105 that supports sidelink resource pool distribution in accordance with aspects of the present disclosure. The device 1105 may be an example of or include the components of device 805, device 905, or a UE 115. For example, device 1105 may be a transmitting UE in communication with a target UE and a non-target UE, a target UE in communication with a transmitting UE and a non-target UE, or a non-target UE in communication with a transmitting UE and a target UE. In some examples, the transmitting UE may be referred to as a first UE, and the non-target UE may be referred to as a second UE or a third UE. In some examples, the non-target UE may be referred to as a first UE and the transmitting UE may be referred to as a second UE or a third UE. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (for example, bus 1145).

The communications manager 1110 may determine shared resources for communicating over one or more sidelink communication links, the shared resources including control resources and data resources, the control resources and the data resources in a set of slots, transmit, to a second UE on a transmission beam over the control resources in a first portion of a slot of the set of slots, a sidelink request indicating a first set of the data resources for reservation, monitor, by the first UE on a receive beam over the control resources in a second portion of the slot, for one or more sidelink responses from one or more UEs, the one or more sidelink responses including one or more positive sidelink responses indicating a first group of the data resources as available for reservation, or one or more negative sidelink responses indicating a second group of the data resources as unavailable for reservation, or both, and determine, based on the monitoring, whether to transmit a sidelink confirmation indicating a reservation of at least a portion of the first set of the data resources to the second UE over the control resources in a third portion of the slot. The communications manager 1110 may also determine shared resources for communicating over one or more sidelink communication links, the shared resources including control resources and data resources, the control resources and the data resources in a set of slots, monitor, on a receive beam over the control resources in a first portion of a slot of the set of slots, for a sidelink request from a first UE indicating a first set of the data resources for reservation, receive, in the first portion of the slot based on the monitoring, the sidelink request from the first UE, the sidelink request indicating that the second UE is a target UE of the sidelink request, and determine, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both. The communications manager 1110 may also determine shared resources for communicating over one or more sidelink communication links, the shared resources including control resources and data resources, the control resources and the data resources in a set of slots, monitor, on a receive beam over the control resources in a first portion of a slot of the set of slots, for a sidelink request from a first UE indicating a first set of the data resources for reservation, receive, in the first portion of the slot based on the monitoring, the sidelink request from the first UE, the sidelink request indicating that a second UE is a target UE of the sidelink request, and determine, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both.

The I/O controller 1115 may manage input and output signals for the device 1105. The I/O controller 1115 may also manage peripherals not integrated into the device 1105. In some examples, the I/O controller 1115 may represent a physical connection or port to an external peripheral. In some examples, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some examples, the I/O controller 1115 may be implemented as part of a processor. In some examples, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some examples, the wireless device may include a single antenna 1125. However, in some examples the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some examples, the memory 1130 may contain, among other things, a basic input/output (IO) system (BIOS) which may control basic hardware or software operation such as the interaction with peripheral components or devices.

The processor 1140 may include an intelligent hardware device, (for example, a general-purpose processor, a digital signal processor (DSP), a CPU, a microcontroller, an ASIC, a field-programmable gate array (FPGA), a programmable logic device, a discrete gate or transistor logic component, a discrete hardware component, or any combination thereof). In some examples, the processor 1140 may be configured to operate a memory array using a memory controller. In other cases, a memory controller may be integrated into the processor 1140. The processor 1140 may be configured to execute computer-readable instructions stored in a memory (for example, the memory 1130) to cause the device 1105 to perform various functions (for example, functions or tasks supporting sidelink resource pool distribution).

The code 1135 may include instructions to implement aspects of the present disclosure, including instructions to support wireless communications. The code 1135 may be stored in a non-transitory computer-readable medium such as system memory or other type of memory. In some examples, the code 1135 may not be directly executable by the processor 1140 but may cause a computer (for example, when compiled and executed) to perform functions described herein.

Figure 12:
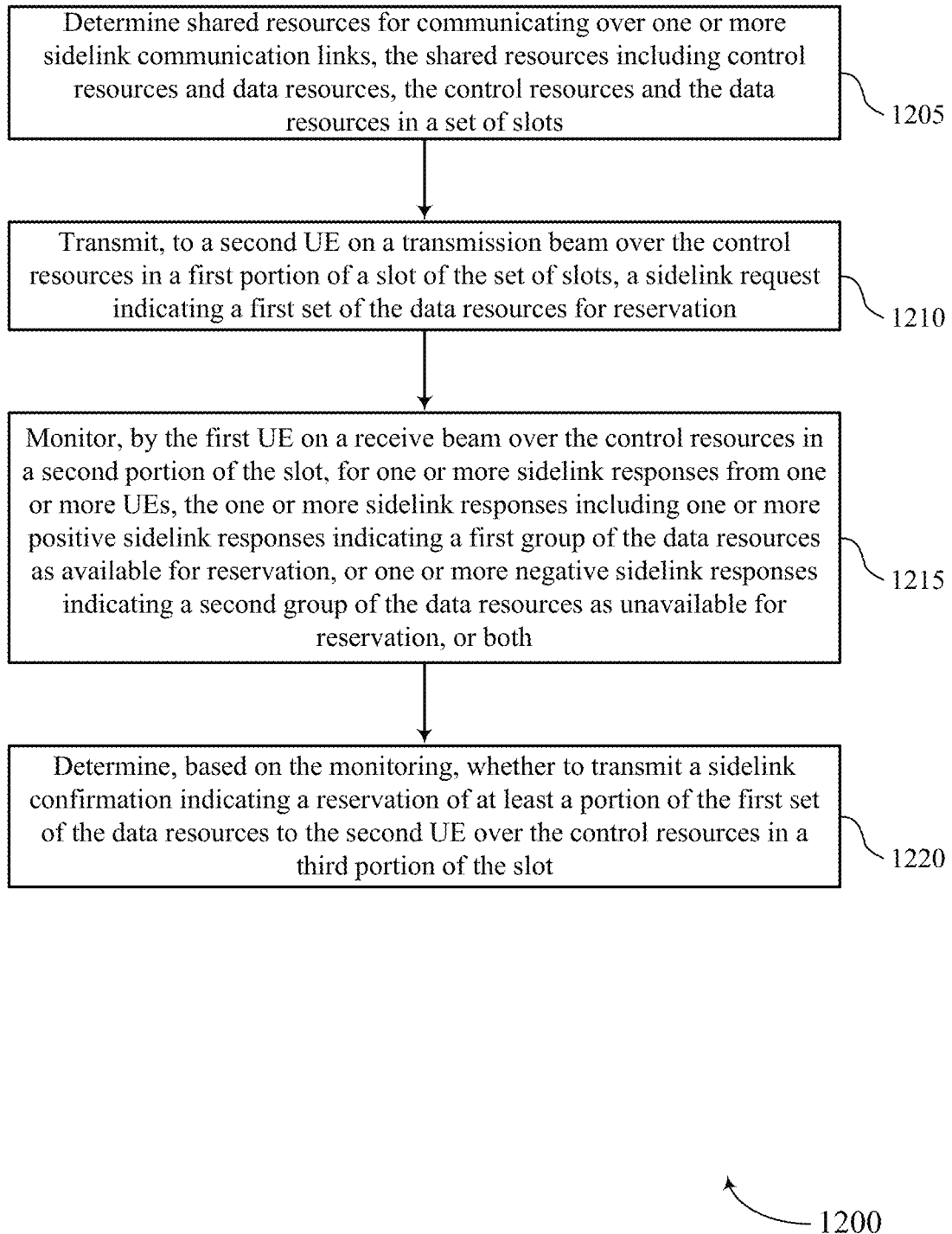
FIGS. 12-14 show flowcharts illustrating methods that support sidelink resource pool distribution in accordance with aspects of the present disclosure.

FIG. 12 shows a flowchart illustrating a method 1200 that supports sidelink resource pool distribution in accordance with aspects of the present disclosure. The operations of method 1200 may be implemented by a UE 115 or its components as described herein. For example, the operations of method 1200 may be performed by a communications manager of a device as described with reference to FIGS. 8-11. In some examples, a UE may execute a set of instructions to control the functional elements of the UE to perform the functions described below. Additionally, or alternatively, a UE may perform aspects of the functions described below using special-purpose hardware. Such a UE may be a transmitting UE in communication with a target UE and a non-target UE.

At 1205, the UE may determine shared resources for communicating over one or more sidelink communication links, the shared resources including control resources and data resources, the control resources and the data resources in a set of slots. The operations of 1205 may be performed according to the methods described herein. In some examples, aspects of the operations of 1205 may be performed by a shared resource manager as described with reference to FIGS. 8-11.

At 1210, the UE may transmit, to a second UE on a transmission beam over the control resources in a first portion of a slot of the set of slots, a sidelink request indicating a first set of the data resources for reservation. The operations of 1210 may be performed according to the methods described herein. In some examples, aspects of the operations of 1210 may be performed by a sidelink request manager as described with reference to FIGS. 8-11.

At 1215, the UE may monitor, by the first UE on a receive beam over the control resources in a second portion of the slot, for one or more sidelink responses from one or more UEs, the one or more sidelink responses including one or more positive sidelink responses indicating a first group of the data resources as available for reservation, or one or more negative sidelink responses indicating a second group of the data resources as unavailable for reservation, or both. The operations of 1215 may be performed according to the methods described herein. In some examples, aspects of the operations of 1215 may be performed by a sidelink response manager as described with reference to FIGS. 8-11.

At 1220, the UE may determine, based on the monitoring, whether to transmit a sidelink confirmation indicating a reservation of at least a portion of the first set of the data resources to the second UE over the control resources in a third portion of the slot. The operations of 1220 may be performed according to the methods described herein. In some examples, aspects of the operations of 1220 may be performed by a sidelink confirmation manager as described with reference to FIGS. 8-11.

Figure 13:
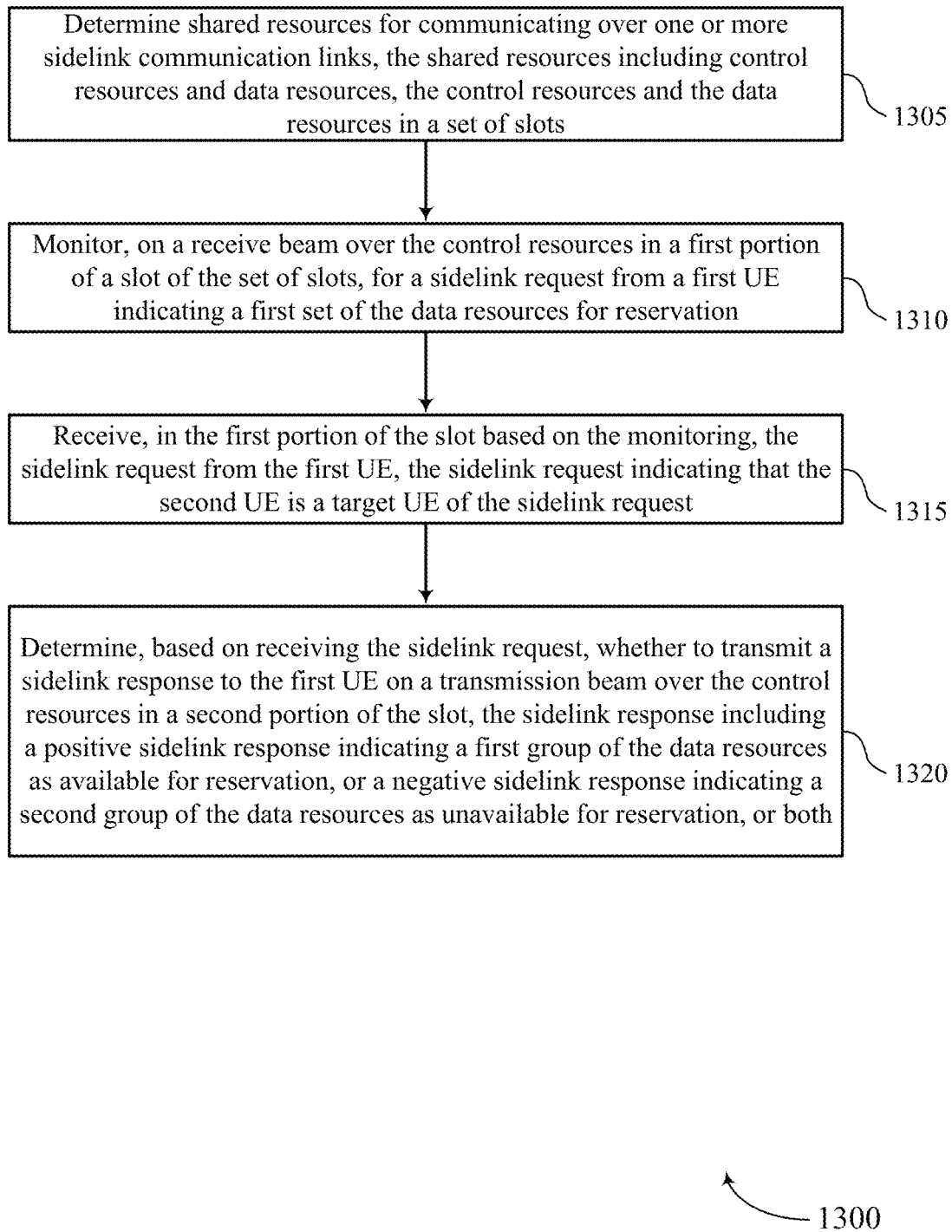

FIG. 13 shows a flowchart illustrating a method 1300 that supports sidelink resource pool distribution in accordance with aspects of the present disclosure. The operations of method 1300 may be implemented by a UE 115 or its components. For example, the operations of method 1300 may be performed by a communications manager as described with reference to FIGS. 8-11. In some examples, a UE may execute a set of instructions to control the functional elements of the UE to perform the functions described below. Additionally, or alternatively, a UE may perform aspects of the functions described below using special-purpose hardware. In some examples, the UE may be a target UE (for example, a second UE) in communication with a transmitting UE (for example, a first UE) and a non-target UE (for example, a second UE, a third UE).

At 1305, the UE may determine shared resources for communicating over one or more sidelink communication links, the shared resources including control resources and data resources, the control resources and the data resources in a set of slots. The operations of 1305 may be performed according to the methods described herein. In some examples, aspects of the operations of 1305 may be performed by a shared resource manager as described with reference to FIGS. 8-11.

At 1310, the UE may monitor, on a receive beam over the control resources in a first portion of a slot of the set of slots, for a sidelink request from a first UE indicating a first set of the data resources for reservation. The operations of 1310 may be performed according to the methods described herein. In some examples, aspects of the operations of 1310 may be performed by a sidelink request manager as described with reference to FIGS. 8-11.

At 1315, the UE may receive, in the first portion of the slot based on the monitoring, the sidelink request from the first UE, the sidelink request indicating that the second UE is a target UE of the sidelink request. The operations of 1315 may be performed according to the methods described herein. In some examples, aspects of the operations of 1315 may be performed by a sidelink request manager as described with reference to FIGS. 8-11.

At 1320, the UE may determine, based on receiving the sidelink request, whether to transmit a sidelink response to the first UE on a transmission beam over the control resources in a second portion of the slot, the sidelink response including a positive sidelink response indicating a first group of the data resources as available for reservation, or a negative sidelink response indicating a second group of the data resources as unavailable for reservation, or both. The operations of 1320 may be performed according to the methods described herein. In some examples, aspects of the operations of 1320 may be performed by a sidelink response manager as described with reference to FIGS. 8-11.

Figure 14:
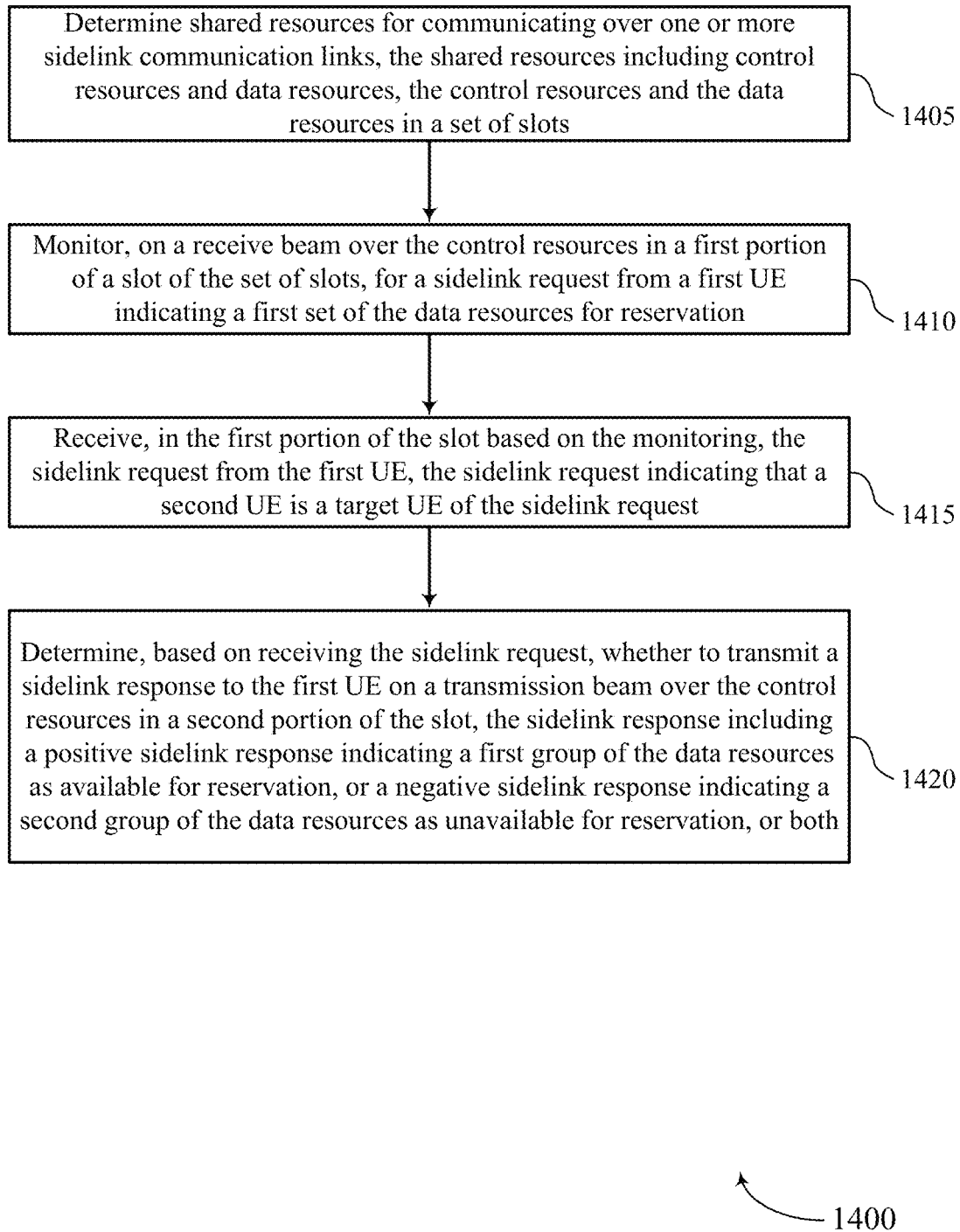

FIG. 14 shows a flowchart illustrating a method 1400 that supports sidelink resource pool distribution in accordance with aspects of the present disclosure. The operations of method 1400 may be implemented by a UE 115 or its components. For example, the operations of method 1400 may be performed by a communications manager as described with reference to FIGS. 8-11. In some examples, a UE may execute a set of instructions to control the functional elements of the UE to perform the functions described below. Additionally, or alternatively, a UE may perform aspects of the functions described below using special-purpose hardware. In some examples, the UE may be a non-target UE in communication with a transmitting UE and a target UE. In some examples, the transmitting UE may be referred to as a first UE, and the non-target UE may be referred to as a second UE or a third UE. In some examples, the non-target UE may be referred to as a first UE and the transmitting UE may be referred to as a second UE or a third UE.

At 1405, the UE may determine shared resources for communicating over one or more sidelink communication links, the shared resources including control resources and data resources, the control resources and the data resources in a set of slots. The operations of 1405 may be performed according to the methods described herein. In some examples, aspects of the operations of 1405 may be performed by a shared resource manager as described with reference to FIGS. 8-11.

At 1410, the UE may monitor, on a receive beam over the control resources in a first portion of a slot of the set of slots, for a sidelink request from a third UE indicating a first set of the data resources for reservation. The operations of 1410 may be performed according to the methods described herein. In some examples, aspects of the operations of 1410 may be performed by a sidelink request manager as described with reference to FIGS. 8-11.

At 1415, the UE may receive, in the first portion of the slot based on the monitoring, the sidelink request from the third UE, the sidelink request indicating that a second UE is a target UE of the sidelink request. The operations of 1415 may be performed according to the methods described herein. In some examples, aspects of the operations of 1415 may be performed by a sidelink response manager as described with reference to FIGS. 8-11.

At 1420, the UE may determine, based on receiving the sidelink request, whether to transmit a sidelink response to the third UE on a transmission beam over the control resources in a second portion of the slot, the sidelink response including a positive sidelink response indicating a first group of the data resources as available for reservation, or a negative sidelink response indicating a second group of the data resources as unavailable for reservation, or both. The operations of 1420 may be performed according to the methods described herein. In some examples, aspects of the operations of 1420 may be performed by a sidelink response manager as described with reference to FIGS. 8-11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   determining shared resources for communicating over one or more sidelink communication links, the shared resources comprising control resources and data resources, the control resources and the data resources in a plurality of slots;
   determining a set of groups of the data resources, the set of groups comprising a first group of the data resources and a second group of the data resources, wherein a first set of the data resources comprises one or more groups of the set of groups of the data resources;
   transmitting, to a second UE on a transmission beam over the control resources in a first portion of a slot of the plurality of slots and based at least in part on determining the set of groups of the data resources, a sidelink request indicating the first set of the data resources for reservation;
   monitoring, by the first UE on a receive beam over the control resources in a second portion of the slot, for one or more sidelink responses from one or more UEs, the one or more sidelink responses comprising one or more positive sidelink responses indicating the first group of the data resources as available for reservation, or one or more negative sidelink responses indicating the second group of the data resources as unavailable for reservation, or both; and
   determining, based at least in part on the monitoring, whether to transmit a sidelink confirmation indicating a reservation of at least a portion of the first set of the data resources to the second UE over the control resources in a third portion of the slot.

2. The method of claim 1, further comprising:
receiving, during the second portion of the slot based at least in part on the monitoring, a positive sidelink response from the second UE indicating the first group of the data resources as available for reservation, and not receiving any negative sidelink responses indicating the second group of the data resources as unavailable for reservation, wherein determining whether to transmit the sidelink confirmation is based at least in part on receiving the positive sidelink response and not receiving any negative sidelink responses;
selecting, from the first group of the data resources based at least in part on determining whether to transmit the sidelink confirmation, the first set of the data resources; and
transmitting, based at least in part on selecting the first set of the data resources, the sidelink confirmation in the third portion of the slot indicating the reservation of the first set of the data resources.

3. The method of claim 1, further comprising:
receiving, in the second portion of the slot based at least in part on the monitoring, a positive sidelink response from the second UE indicating the first group of the data resources as available for reservation and a negative sidelink response from a third UE indicating the second group of the data resources as unavailable for reservation, wherein the first group of the data resources does not overlap with the second group of the data resources, and wherein determining whether to transmit the sidelink confirmation is based at least in part on receiving the positive sidelink response and the negative sidelink response;
selecting, from the first group of the data resources based at least in part on determining whether to transmit the sidelink confirmation, the first set of the data resources; and
transmitting, based at least in part on selecting the first set of the data resources, the sidelink confirmation in the third portion of the slot indicating the reservation of the first set of the data resources.

4. The method of claim 1, further comprising:
receiving, in the second portion of the slot based at least in part on the monitoring, a positive sidelink response from the second UE indicating the first group of the data resources as available for reservation, and a negative sidelink response from a third UE indicating the second group of the data resources as unavailable for reservation, wherein the first group of the data resources at least partially overlaps with the second group of the data resources, and wherein determining whether to transmit the sidelink confirmation is based at least in part on receiving the positive sidelink response and the negative sidelink response; and
refraining from transmitting, based at least in part on determining whether to transmit the sidelink confirmation, the sidelink confirmation in the third portion of the slot indicating the reservation of the first set of the data resources.

5. The method of claim 1, further comprising:
not receiving, in the second portion of the slot based at least in part on the monitoring, a positive sidelink response from the second UE indicating the first group of the data resources as available for reservation, wherein the first group of the data resources at least partially overlaps with the first set of the data resources, and wherein determining whether to transmit the sidelink confirmation is based at least in part on not receiving the positive sidelink response from the second UE; and
refraining from transmitting, based at least in part on determining whether to transmit the sidelink confirmation, the sidelink confirmation in the third portion of the slot indicating the reservation of the first set of the data resources.

6. The method of claim 1, further comprising selecting, from the set of groups of the data resources, the first group of the data resources and the second group of the data resources, wherein the sidelink request indicates that the first set of the data resources for reservation comprise one or more of the first group of the data resources or the second group of the data resources.

7. The method of claim 6, further comprising:
receiving, in the second portion of the slot based at least in part on the monitoring, a positive sidelink response from the second UE indicating the first group of the data resources and the second group of the data resources as available for reservation, and a negative sidelink response from a third UE indicating the second group of the data resources as unavailable for reservation, wherein the first group of the data resources does not overlap with the second group of the data resources, and wherein determining whether to transmit the sidelink confirmation is based at least in part on receiving the positive sidelink response and the negative sidelink response;
selecting, from the first group of the data resources based at least in part on determining whether to transmit the sidelink confirmation, the first set of the data resources; and
transmitting, based at least in part on selecting the first set of the data resources, the sidelink confirmation in the third portion of the slot indicating the reservation of at least a portion of the first set of the data resources comprising the first group of the data resources.

8. The method of claim 6, further comprising:
receiving, in the second portion of the slot based at least in part on the monitoring, a positive sidelink response from the second UE indicating the first group of the data resources as available for reservation, and a negative sidelink response from a third UE indicating the second group of the data resources as unavailable for reservation, wherein the first group of the data resources and the second group of the data resources at least partially overlap, and wherein determining whether to transmit the sidelink confirmation is based at least in part on receiving the positive sidelink response and the negative sidelink response; and
refraining from transmitting, based at least in part on determining whether to transmit the sidelink confirmation, the sidelink confirmation in the third portion of the slot indicating the reservation of at least a portion of the first set of the data resources.

9. The method of claim 6, further comprising:
receiving, in the second portion of the slot based at least in part on the monitoring, a positive sidelink response from the second UE indicating the first group of the data resources as available for reservation, and a negative sidelink response from a third UE indicating the second group of the data resources as unavailable for reservation, wherein the first group of the data resources does not overlap with the second group of the data resources, and wherein determining whether to transmit the sidelink confirmation is based at least in part on receiving the positive sidelink response and the negative sidelink response;

selecting, from the first group of the data resources based at least in part on determining whether to transmit the sidelink confirmation, the first set of the data resources; and transmitting, based at least in part on selecting the first set of the data resources, the sidelink confirmation in the third portion of the slot indicating the reservation of at least the portion of the first set of the data resources comprising the first group of the data resources.

10. The method of claim 6, further comprising:

receiving, in the second portion of the slot based at least in part on the monitoring, a positive sidelink response from the second UE indicating the first group of the data resources as available, and not receiving any negative sidelink responses indicating the second group of the data resources as unavailable for reservation, wherein determining whether to transmit the sidelink confirmation is based at least in part on receiving the positive sidelink response and not receiving any negative sidelink responses;

selecting, from the first group of the data resources based at least in part on determining whether to transmit the sidelink confirmation, the first set of the data resources; and transmitting, based at least in part on selecting the first set of the data resources, the sidelink confirmation in the third portion of the slot indicating the reservation of at least a portion of the first set of the data resources.

11. The method of claim 6, further comprising:

not receiving, in the second portion of the slot based at least in part on the monitoring, a positive sidelink response from the second UE indicating the first group of the data resources as available for reservation, wherein determining whether to transmit the sidelink confirmation is based at least in part on not receiving the positive sidelink response from the second UE; and refraining from transmitting, based at least in part on determining whether to transmit the sidelink confirmation, the sidelink confirmation in the third portion of the slot indicating the reservation of at least a portion of the first set of the data resources.

12. The method of claim 6, further comprising determining at least a portion of a third group of the data resources of the set of groups of the data resources as reserved for a beam monitoring procedure, wherein selecting the first group of the data resources and the second group of the data resources is based at least in part on determining at least the portion of the third group.

13. The method of claim 1, further comprising receiving, from a base station, an indication of the set of groups of the data resources, wherein determining the set of groups of the data resources is based at least in part on receiving the indication of the set of groups of the data resources.

14. The method of claim 1, further comprising:

determining a set of tones, a set of waveforms, a set of the control resources in the first portion of the slot, or any combination thereof; and selecting a tone from the set of tones, a waveform from the set of waveforms, a control resource from the set of the control resources, or any combination thereof, wherein the selected tone, waveform, control resource, or combination thereof corresponds to the first set of the data resources, and wherein transmitting the sidelink request indicating the first set of the data resources for reservation is based at least in part on the selected tone, waveform, control resource, or combination thereof.

15. A method for wireless communications at a first user equipment (UE), comprising:

determining shared resources for communicating over one or more sidelink communication links, the shared resources comprising control resources and data resources, the control resources and the data resources in a plurality of slots;

determining a set of groups of the data resources, the set of groups comprising a first group of the data resources and a second group of the data resources, the first set of the data resources comprising one or more groups of the set of groups of the data resources;

monitoring, on a receive beam over the control resources in a first portion of a slot of the plurality of slots, for a sidelink request from a second UE indicating that the first set of the data resources for reservation comprises one or more of the first group of the data resources or the second group of the data resources;

receiving, in the first portion of the slot based at least in part on the monitoring, the sidelink request from the second UE, the sidelink request indicating that a third UE is a target UE of the sidelink request; and determining, based at least in part on receiving the sidelink request, whether to transmit a sidelink response to the second UE on a transmission beam over the control resources in a second portion of the slot, the sidelink response comprising a positive sidelink response indicating the first group of the data resources as available for reservation, or a negative sidelink response indicating the second group of the data resources as unavailable for reservation, or both.

16. The method of claim 15, further comprising:

determining that the second group of the data resources is available for reservation;

refraining from transmitting, in the second portion of the slot based at least in part on determining that the second group of the data resources is available for reservation, the negative sidelink response;

monitoring, in a third portion of the slot based at least in part on refraining from transmitting the negative sidelink response, for a sidelink confirmation; and receiving, in the third portion of the slot based at least in part on the monitoring, the sidelink confirmation indicating a reservation of at least the portion of the first set of the data resources comprising the first group of the data resources, or the second group of the data resources, or both.

17. The method of claim 15, further comprising:

determining that the second group of the data resources is unavailable for reservation; and transmitting, in the second portion of the slot based at least in part on determining that the second group of the data resources is unavailable for reservation, the negative sidelink response.

18. The method of claim 17, further comprising receiving, in a third portion of the slot based at least in part on transmitting the negative sidelink response, a sidelink confirmation indicating a reservation of at least a portion of the first set of the data resources comprising the first group of the data resources.

19. The method of claim 17, further comprising determining, based at least in part on monitoring for a sidelink confirmation, that the second UE has not transmitted the sidelink confirmation indicating a reservation of at least a portion of the first set of the data resources.

20. The method of claim 15, further comprising:
transmitting, to the second UE in the second portion of the slot based at least in part on receiving the sidelink request, the negative sidelink response indicating the second group of the data resources as unavailable for reservation; and
monitoring, in a third portion of the slot based at least in part on transmitting the negative sidelink response, for a sidelink confirmation from the second UE.

21. The method of claim 20, further comprising receiving, in the third portion of the slot based at least in part on the monitoring, the sidelink confirmation indicating a reservation of at least a portion of the first set of the data resources comprising the first group of the data resources, wherein the first group of the data resources does not overlap with the second group of the data resources.

22. The method of claim 20, further comprising determining, based at least in part on monitoring for the sidelink confirmation, that the second UE has not transmitted the sidelink confirmation indicating a reservation of at least a portion of the first set of the data resources comprising the first group of the data resources, wherein the first group of the data resources and the second group of the data resources at least partially overlap.

23. The method of claim 15, further comprising:
determining that the second group of the data resources is available for transmitting; and
refraining from transmitting, in a third portion of the slot based at least in part on determining that the second group of the data resources is available for transmitting, the negative sidelink response.

24. The method of claim 15, further comprising determining at least a portion of a third group of the data resources of the set of groups of the data resources that is reserved for beam monitoring, wherein determining whether to transmit the sidelink response is based at least in part on determining the third group of the data resources.

25. The method of claim 15, further comprising receiving, from a base station, an indication of the set of groups of the data resources, wherein determining the set of groups of the data resources is based at least in part on receiving the indication of the set of groups of the data resources.

26. The method of claim 15, further comprising:
determining a set of tones, a set of waveforms, a set of the control resources in the first portion of the slot, or any combination thereof, wherein each tone, waveform, control resource, or combination thereof corresponds to a different set of the data resources; and
determining, upon receiving the sidelink request indicating the first set of the data resources for reservation, a first tone of the set of tones, a first waveform of the set of waveforms, a first control resource of the set of the control resources, or a first combination thereof, that indicates the first set of the data resources, wherein determining whether to transmit the sidelink response in the second portion of the slot is based at least in part on determining the first tone of the set of tones, the first waveform of the set of waveforms, the first control resource of the set of the control resources, or the first combination thereof.

27. An apparatus for wireless communications at a first user equipment (UE), comprising:
a processor,
memory coupled with the processor; and
instructions stored in the memory and executable by the processor to cause the apparatus to:
determine shared resources for communicating over one or more sidelink communication links, the shared resources comprising control resources and data resources, the control resources and the data resources in a plurality of slots;
determine a set of groups of the data resources, the set of groups comprising a first group of the data resources and a second group of the data resources, wherein a first set of the data resources comprises one or more groups of the set of groups of the data resources;
transmit, to a second UE on a transmission beam over the control resources in a first portion of a slot of the plurality of slots and based at least in part on determining the set of groups of the data resources, a sidelink request indicating the first set of the data resources for reservation;
monitor, by the first UE on a receive beam over the control resources in a second portion of the slot, for one or more sidelink responses from one or more UEs, the one or more sidelink responses comprising one or more positive sidelink responses indicating the first group of the data resources as available for reservation, or one or more negative sidelink responses indicating the second group of the data resources as unavailable for reservation, or both; and
determine, based at least in part on the monitoring, whether to transmit a sidelink confirmation indicating a reservation of at least a portion of the first set of the data resources to the second UE over the control resources in a third portion of the slot.

28. An apparatus for wireless communications at a first user equipment (UE), comprising:
a processor,
memory coupled with the processor; and
instructions stored in the memory and executable by the processor to cause the apparatus to:
determine shared resources for communicating over one or more sidelink communication links, the shared resources comprising control resources and data resources, the control resources and the data resources in a plurality of slots;
determine a set of groups of the data resources, the set of groups comprising a first group of the data resources and a second group of the data resources, the first set of the data resources comprising one or more groups of the set of groups of the data resources;
monitor, on a receive beam over the control resources in a first portion of a slot of the plurality of slots, for a sidelink request from a second UE indicating that the first set of the data resources for reservation comprises one or more of the first group of the data resources or the second group of the data resources;
receive, in the first portion of the slot based at least in part on the monitoring, the sidelink request from the second UE, the sidelink request indicating that a third UE is a target UE of the sidelink request; and
determine, based at least in part on receiving the sidelink request, whether to transmit a sidelink response to the second UE on a transmission beam over the control resources in a second portion of the slot, the sidelink response comprising a positive sidelink response indicating the first group of the data resources as available for reservation, or a negative sidelink response indicating the second group of the data resources as unavailable for reservation, or both.

\* \* \* \* \*